United States Patent
Nagashima et al.

(10) Patent No.: US 7,079,710 B2
(45) Date of Patent: Jul. 18, 2006

(54) IMAGE-EFFECT METHOD AND IMAGE INTERPOLATION METHOD

(75) Inventors: Hiroki Nagashima, Chiba (JP); Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 686 days.

(21) Appl. No.: 10/040,438

(22) Filed: Jan. 9, 2002

(65) Prior Publication Data

US 2002/0186898 A1 Dec. 12, 2002

(30) Foreign Application Priority Data

Jan. 10, 2001 (JP) .............................. 2001-002070

(51) Int. Cl.
*G06K 9/32* (2006.01)
(52) U.S. Cl. ..................... 382/300; 382/295; 382/302; 358/525
(58) Field of Classification Search ................ 382/278, 382/284, 294, 299, 300, 293, 295; 358/1.2, 358/3.26, 3.27, 525, 540
See application file for complete search history.

(56) References Cited

U.S. PATENT DOCUMENTS

| | | |
|---|---|---|
| 6,018,592 A | 1/2000 | Shinagawa et al. |
| 6,137,910 A | 10/2000 | Shinagawa et al. |
| 6,300,960 B1 * | 10/2001 | DeRose et al. ............. 345/474 |
| 6,362,833 B1 * | 3/2002 | Trika ........................... 345/646 |
| 6,411,965 B1 * | 6/2002 | Klug ........................... 707/201 |
| 6,525,732 B1 * | 2/2003 | Gadh et al. ................. 345/428 |
| 6,597,368 B1 * | 7/2003 | Arai et al. ................... 345/646 |
| 6,608,628 B1 * | 8/2003 | Ross et al. .................. 345/619 |

OTHER PUBLICATIONS

Office Action of Mar. 4, 2003 from Japanese Patent Application No. 2001-002070, pp. 1-2.
English Translation of the Office Actions of Mar. 4, 2003 from Japanese Patent Application No. 2001-002070, 1 page.
"New Trends in 3D Shape Compression Techniques", IPSJ Magazine, vol. 40, No. 3, 1999-3, 7 pages. (no English translation available).

* cited by examiner

*Primary Examiner*—Samir Ahmed
*Assistant Examiner*—Yosef Kassa

(57) ABSTRACT

An image input unit acquires a first image and a second image. A matching processor computes a pixel matching between the images so that corresponding points are obtained on the second image with respect to lattice points of a mesh defined on the first image. A result thereof is recorded as a corresponding point file. An intermediate image generator generates an intermediate image of the first image and the second image based on the corresponding point file. Since the corresponding point file is composed of corresponding lattice points alone rather than corresponding pixels or the like, the amount of data is relatively small, and thereby allows efficient implementation of and application to various image effects, motion picture compression, on-line commodity presentation, and mobile applications.

20 Claims, 18 Drawing Sheets

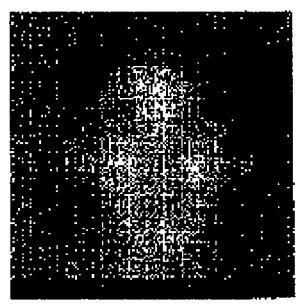
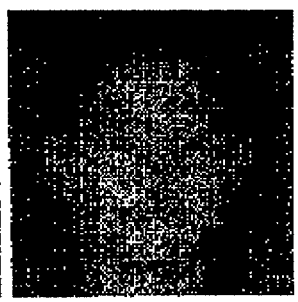
Fig.1a    Fig.1b
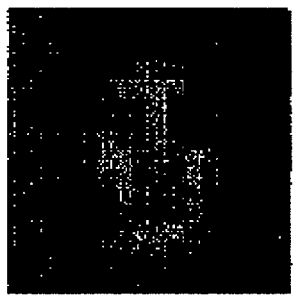
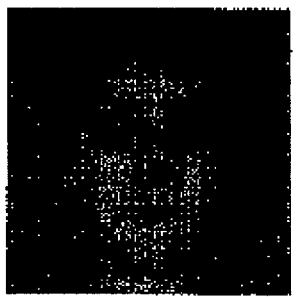
Fig.1c    Fig.1d
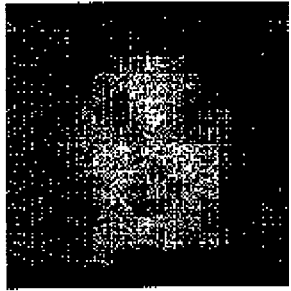
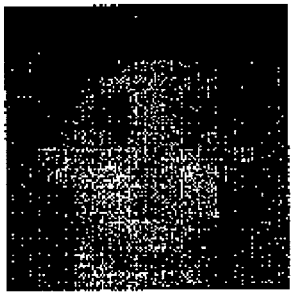
Fig.1e    Fig.1f
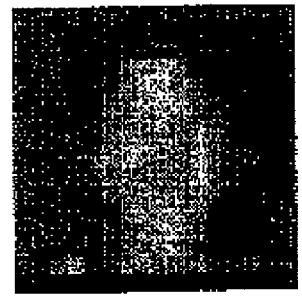
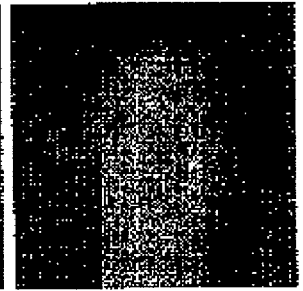
Fig.1g    Fig.1h
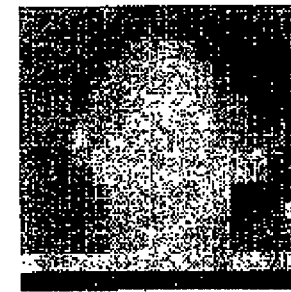
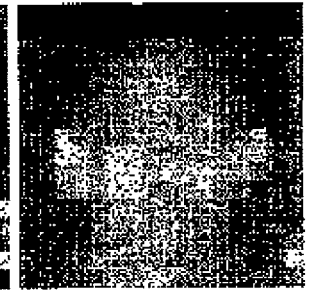
Fig.1i    Fig.1j

Fig. 9

IMAGE-EFFECT METHOD AND IMAGE INTERPOLATION METHOD

BACKGROUND OF THE INVENTION

1. Field of the Invention

The present invention relates to image processing techniques, and more particularly relates to a method and apparatus for digital image-effect and interpolation techniques.

2. Description of the Related Art

As a part of the digital revolution, many users have come to enjoy services on the Internet from personal computers and portable telephones. The digital revolution is now spreading to broadcast services and movies, including digital satellite broadcasts. Thus, a barrier that had previously existed between broadcasting and communications is quickly beginning to disappear. Moreover, as broadband communications grow, multimedia content and culture will experience significant development, and, as a part of this multimedia culture, the distribution of video or motion pictures will become a key technology.

When humans acquire information from the outside world, images are capable of conveying much more information than audio. Besides being used for entertainment and recreational purposes, it is believed that images will also serve as a vital part of a software infrastructure which will support a wide range of aspects of human life and culture. As images are used more and more in a digital form, image-effect technology will expand into many fields with additional applications in computer graphics (CG) and image processing technologies.

SUMMARY OF THE INVENTION

Conventionally, various image effects have been proposed and used. For example, there are walk-through, multi-viewpoint image, special filtering, pseudo stereoscopic vision and so forth. As the use of and importance of images increases in society in the future, it is important that these image effects be provided with further improved quality and they can be implemented with high data compression to meet the requirements of communications and transmission systems. The present invention has been made in view of these circumstances, and an object of the invention is to provide an image effect technique by which motion pictures can be generated based on a small amount of image data.

It is noted that the objects of the present invention are not limited to image effects only, another object of the present invention is to provide an image interpolation technique by which various image techniques in the age of digital culture and the Internet can be realized.

According to one aspect of the present invention, an image-effect method is provided. The method comprises computing a matching between a first image and a second image and detecting a corresponding point on the second image, which corresponds to a lattice point of a mesh on the first image, and defining a destination polygon on the second image using the detected corresponding point, wherein the destination polygon corresponds to a source polygon that constitutes the mesh on the first image.

The matching may be computed pixel by pixel between the first image and the second image. This matching computation may be performed on, for example, all pixels, only lattice points, or lattice points and some related pixels thereof.

The matching may be computed pixel by pixel based on correspondence between a critical point detected through a two-dimensional search on the first image and a critical point detected through a two-dimensional search on the second image. In this case, said detecting the corresponding point may comprise multiresolutionalizing the first image and the second image by respectively extracting the critical points, performing a pixel-by-pixel matching computation on the first image and the second image at each multiresolution level while inheriting a result of a pixel-by-pixel matching computation at a different multiresolution level, and acquiring a pixel-by-pixel correspondence relation at a finest level of resolution.

The defining the destination polygon may comprise outputting a correspondence relation between the source polygon and the destination polygon to a corresponding point file, and retaining the corresponding point file in a manner such that said corresponding point file is associated to the first image and the second image. The method may further comprise generating an intermediate image between the first image and the second image by performing a polygon-by-polygon interpolation computation using said corresponding point file. The generating the intermediate image may include computing a corresponding point inside the destination polygon that corresponds to a point inside the source polygon. The generating the intermediate image may also include dividing the source polygon into triangles and computing the corresponding point inside the destination polygon through an interior division concerning vectors defined on each of the triangles.

The above-mentioned matching method utilizing the critical points is an application of the technique (referred to as the "base technology" hereinafter) proposed in Japanese Patent No. 2927350 owned by the same assignee of the present patent application, and the method is also suitable for the detection of the corresponding points. However, it is to be noted that the base technology is not prerequisite for the present invention and that the base technology does not touch on the features of the present invention relating to the lattice points or the polygons determined thereby. Introduction of a somewhat simplified technique, such as the polygons in the embodiments of the present invention, makes possible a significant reduction in the size of the corresponding point file.

For example, in a case where the first and second images each have n×m pixels, there are $(n \times m)^2$ combinations if their pixel-by-pixel correspondence is described as it is, so that the size of the corresponding point file will become extremely large. However, if instead, this correspondence is modified by describing only the correspondence relation between the lattice points or, substantially equivalently, the correspondence relation between polygons determined by the lattice points, the data amount is reduced significantly.

Further, since the first and second images and the corresponding point file can be used to generate intermediate images through interpolation computation, the present invention realizes what is called morphing in image effects. Also, if the first and second images are considered as frames in a motion picture, the present invention can be recognized as a compression technique for motion pictures. Storage of the first and second images and the corresponding point file for use in generating intermediate images can achieve reproduction of motion pictures, and thereby significant improvements can be achieved in the transmission, storage and so forth of motion pictures.

According to another aspect of the present invention, an image-effect apparatus is provided. The apparatus comprises an image input unit which obtains a first image and a second image, and a matching processor which computes a matching between the first image and the second image. The matching processor generates a corresponding point file by defining a destination polygon on the second image, which corresponds to a source polygon that constitutes a mesh on the first image.

The matching processor may compute the matching pixel by pixel based on correspondence between a critical point detected through a two-dimensional search on the first image and a critical point detected through a two-dimensional search on the second image. The matching processor may multiresolutionalize the first image and the second image by respectively extracting the critical points, perform a pixel-by-pixel matching computation on the first image and the second image at each multiresolution level while inheriting a result of a pixel-by-pixel matching computation in a different multiresolution level, and acquire a pixel-by-pixel correspondence relation at a finest level of resolution.

According to another aspect of the invention, an image-effect apparatus may comprise an intermediate image generator which obtains a first image, a second image and a corresponding point file, and generates an intermediate image between the two images. In this case, the corresponding point file may describe a positional correspondence relation between a lattice point of a mesh defined on the first image and a corresponding point on the second image. The apparatus may comprise a display unit which adjusts a timing of the intermediate image, the first image, and the second image and displays these images.

According to still another aspect of the present invention, an image interpolation method is provided. The method comprises obtaining correspondence information between a source polygon which constitutes a mesh provided on a first image and a destination polygon which constitutes a mesh on a second image, generating an intermediate image between the first image and the second image based on the correspondence information, and providing an electronic commerce commodity presentation function when the intermediate image is generated.

Alternatively, the commodity presentation function may be replaced with an image-effect function or a utility function for generating a motion picture. Further, the generation and display of the intermediate image or images may be performed based on a mobile function which assumes application to a mobile device.

The commodity presentation function may include displaying a commodity rotating according to an instruction from a user. Alternatively, the commodity presentation function may include displaying an intermediate image obtained by interpolating a commodity image in two directions, for example, horizontal and vertical directions.

The image-effect function may include sequentially choosing two images out of a plurality of images as the first and second images, and smoothly and continuously displaying the intermediate image or images generated from the sequentially chosen two images. For example, when many discrete images with different viewpoints are sequentially interpolated and the intermediate images are generated, a panoramic image or image sequence can be obtained. If the intermediate images are displayed in order as if the viewpoint is moving over time, a "walk-through" image can be obtained. The image-effect function may also include displaying an intermediate image obtained by interpolating an image to be processed in two directions.

The utility function may include specifying a number of the intermediate images to be generated. If a large number of intermediate images are generated, a slow motion picture, for instance, can be generated. By allowing the number of the intermediate images to be specified, the playback speed of the motion picture can be interactively set. The specification of the number of the intermediate images to be generated may be obtained from a user, via a graphical user interface (GUI) or the like.

The mobile function which assumes application to a mobile device may include displaying the intermediate image generated based on either the first image or the second image and said correspondence information. In this case, a memory capacity to store the images temporarily can be saved (i.e. reduced). When the intermediate image is generated from only the correspondence information and the first image, the points such as the pixels or the polygons of the meshes on the first image and so forth, sometimes simply called pixels, may be moved according to the correspondence information. That is, although normally the position and value of the pixels would be interpolated using the correspondence information, the process is simplified and reduced to only the movement of the position of the pixels. Of course, the correspondence information itself may also incorporate color information of the pixels on the second image. In this case, both the position and color of the pixels can be adjusted satisfactorily.

In a particular case, the intermediate image may be generated through a streaming process for either the first image or the second image and the correspondence information. In this case, memory capacity required for the process can be reduced and it is advantageous for implementation to portable telephones or other wireless or mobile terminals.

According to still another aspect of the present invention, an image interpolation apparatus is provided. The apparatus may comprise an intermediate image generating unit which obtains correspondence information between a source polygon which constitutes a mesh on a first image and a destination polygon which constitutes a mesh on a second image, and generates an intermediate image between the first image and the second image based on the correspondence information. The intermediate image generating unit may provide an electronic commerce commodity presentation function when the intermediate image is generated. Alternatively, the intermediate image generating unit may provide an image-effect function, a utility function for generating a motion picture, or a mobile function which assumes application to a mobile device.

The apparatus may comprise a display unit which adjusts a timing of the intermediate image, the first image, and the second image and displays these images.

It is to be noted that it is also possible to have replacement or substitution of the above-described structural components, elements and processes in part or whole as between process and apparatus or to add components, elements or processes to either process or apparatus. Also, the apparatuses and processes may be implemented by a computer program and saved on a recording medium or the like and are all effective as and encompassed by the present invention.

Moreover, this summary of the invention does not necessarily describe all necessary features, so that the invention may also be a sub-combination of these described features.

BRIEF DESCRIPTION OF THE DRAWINGS

FIG. 1(a) is an image obtained as a result of the application of an averaging filter to a human facial image.

FIG. 1(b) is an image obtained as a result of the application of an averaging filter to another human facial image.

FIG. 1(c) is an image of a human face at $p^{(5,0)}$ obtained in a preferred embodiment in the base technology.

FIG. 1(d) is another image of a human face at $p^{(5,0)}$ obtained in a preferred embodiment in the base technology.

FIG. 1(e) is an image of a human face at $p^{(5,1)}$ obtained in a preferred embodiment in the base technology.

FIG. 1(f) is another image of a human face at $p^{(5,1)}$ obtained in a preferred embodiment in the base technology.

FIG. 1(g) is an image of a human face at $p^{(5,2)}$ obtained in a preferred embodiment in the base technology.

FIG. 1(h) is another image of a human face at $p^{(5,2)}$ obtained in a preferred embodiment in the base technology.

FIG. 1(i) is an image of a human face at $p^{(5,3)}$ obtained in a preferred embodiment in the base technology.

FIG. 1(j) is another image of a human face at $p^{(5,3)}$ obtained in a preferred embodiment in the base technology.

FIG. 9 is a diagram showing correspondence between partial images of the m-th and (m−1)th levels of resolution.

DETAILED DESCRIPTION OF THE INVENTION

Figure 2R:
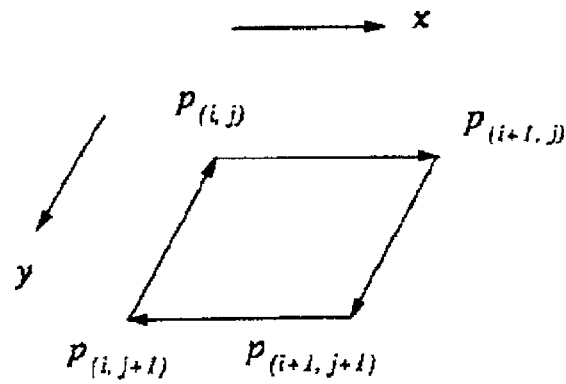
FIG. 2(R) shows an original quadrilateral.
Figure 2A:
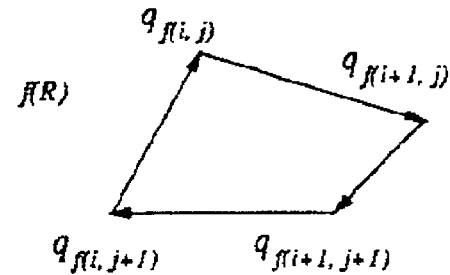
FIG. 2(A) shows an inherited quadrilateral.
Figure 2E:
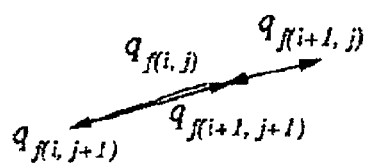
FIG. 2(E) shows an inherited quadrilateral.
Figure 2B:
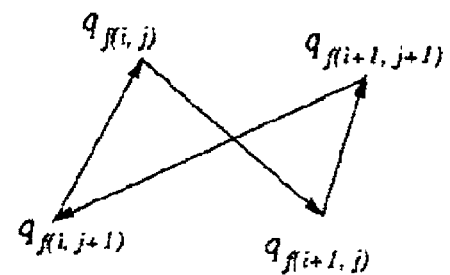
FIG. 2(B) shows an inherited quadrilateral.
Figure 2D:
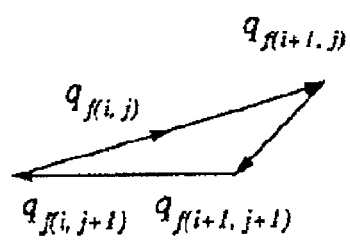
FIG. 2(D) shows an inherited quadrilateral.
Figure 2C:
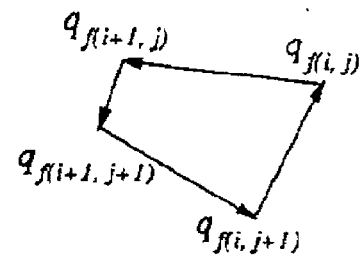
FIG. 2(C) shows an inherited quadrilateral.

The invention will now be described based on the preferred embodiments, which are not intended to limit the scope of the present invention, but exemplify the invention. All of the features and the combinations thereof described in the embodiment are not necessarily essential to the invention.

First, the multiresolutional critical point filter technology and the image matching processing using the technology, both of which will be utilized in the preferred embodiments, will be described in detail as "Base Technology". Namely, the following sections [1] and [2]0 (below) belong to the base technology, where section [1] describes elemental techniques and section [2] describes a processing procedure. These techniques are patented under Japanese Patent No. 2927350 and owned by the same assignees of the present invention. However, it is to be noted that the image matching techniques provided in the present embodiments are not limited to the same levels. In particular, in FIGS. 18 to 20, image effect and image interpolation techniques and apparatus representing embodiments of the present invention and utilizing the base technology will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution.

Initially, let the width of an image to be examined be N and the height of the image be M. For simplicity, assume that $N=M=2n$ where n is a positive integer. An interval $[0, N] \subset R$ is denoted by I. A pixel of the image at position (i, j) is denoted by $p^{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutional filter then extracts the critical points from the original image to construct another image having a lower resolution. Here, the size of each of the respective images of the m-th level is denoted as $2^m \times 2^m$ (0<m<n). A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$
$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$
$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$
$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$$p^{(m,0)} = \alpha(x)\alpha(y)p^{(m+1,0)}$$
$$p^{(m,1)} = \alpha(x)\beta(y)p^{(m+1,1)}$$
$$p^{(m,2)} = \beta(x)\alpha(y)p^{(m+1,2)}$$
$$p^{(m,2)} = \beta(x)\beta(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x) \alpha(y)$ preserves the local minimum point (minima point), $\beta(x) \beta(y)$ preserves the local maximum point (maxima point), $\alpha(x) \beta(y)$ and $\beta(x) \alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $$p_{(i,j)}^{(n)}$$

and that of the destination image at (k,l) is denoted by $$q_{(k,l)}^{(n)}$$

where $i, j, k, l \in I$. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}:p^{(m,0)} \rightarrow q^{(m,0)}$ between $p^{(m,0)}$ and $q^{(m,0)}$ with the minimum energy is computed. Based on $f^{(m,0)}$, the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0, 1, 2, . . . ) is referred to as a submapping. The order of i will be rearranged as shown in the following equation (3) in computing $f^{(m,i)}$ for reasons to be described later.

$$f^{(m,i)}:p^{(m,\sigma(i))} \rightarrow q^{(m,\sigma(i))} \quad (3)$$

where $\sigma(i) \in \{0, 1, 2, 3\}$.

[1.3.1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \rightarrow I/2^{n-m} \times I/2^{n-m}$ (s=0, 1, ...), where $$f_{(i,j)}^{(m,s)} = (k, l)$$

means that $$p_{(i,j)}^{(m,s)}$$

of the source image is mapped to $$q_{(k,l)}^{(m,s)}$$

of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p_{(i,j)}^{(m,s)} p_{(i+1,j)}^{(m,s)} p_{(i+1,j+1)}^{(m,s)} p_{(i,j+1)}^{(m,s)} \quad (4)$$

where i=0, ..., $2^m-1$, and j=0, ..., $2^m-1$. The edges of R are directed as follows:

$$\overrightarrow{p_{(i,j)}^{(m,s)} p_{(i+1,j)}^{(m,s)}}, \overrightarrow{p_{(i+1,j)}^{(m,s)} p_{(i+1,j+1)}^{(m,s)}}, \overrightarrow{p_{(i+1,j+1)}^{(m,s)} p_{(i,j+1)}^{(m,s)}} \text{ and } \overrightarrow{p_{(i,j+1)}^{(m,s)} p_{(i,j)}^{(m,s)}} \quad (5)$$

This square region R will be mapped by f to a quadrilateral on the destination image plane:

$$q_{f(i,j)}^{(m,s)} q_{f(i+1,j)}^{(m,s)} q_{f(i+1,j+1)}^{(m,s)} q_{f(i,j+1)}^{(m,s)} \quad (6)$$

This mapping $f^{(m,s)}$ (R), that is, $$f^{(m,s)}(R) = f^{(m,s)}(p_{(i,j)}^{(m,s)} p_{(i+1,j)}^{(m,s)} p_{(i+1,j+1)}^{(m,s)} p_{(i,j+1)}^{(m,s)} = q_{f(i,j)}^{(m,s)} q_{f(i+1,j)}^{(m,s)} q_{f(i+1,j+1)}^{(m,s)} q_{f(i,j+1)}^{(m,s)})$$

should satisfy the following bijectivity conditions(referred to as BC hereinafter):

1. The edges of the quadrilateral $f^{(m,s)}$ (R) should not intersect one another.
2. The orientation of the edges of $f^{(m,s)}$ (R) should be the same as that of R (clockwise in the case shown in FIG. 2, described below).
3. As a relaxed condition, a retraction mapping is allowed.

Without a certain type of a relaxed condition as in, for example, condition 3 above, there would be no mappings which completely satisfy the BC other than a trivial identity mapping. Here, the length of a single edge of $f^{(m,s)}$ (R) may be zero. Namely, $f^{(m,s)}$ (R) may be a triangle. However, $f^{(m,s)}$ (R) is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, f(i,j)=(i,j) (on the four lines of i=0, i=$2^m$-1, j=0, j=$2^m$-1). This condition will be hereinafter referred to as an additional condition.

[1. 3. 2] Energy of Mapping

[1. 3. 2. 1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $$C_{(i,j)}^{(m,s)}$$

of the mapping $f^{(m,s)}$ at(i,j) is determined by the following equation (7).

$$C_{(i,j)}^{(m,s)} = |V(p_{(i,j)}^{(m,s)}) - V(q_{f(i,j)}^{(m,s)})|^2 \quad (7)$$

where $$V(p_{(i,j)}^{(m,s)}) \text{ and } V(q_{f(i,j)}^{(m,s)})$$

are the intensity values of the pixels $$p_{(i,j)}^{(m,s)} \text{ and } q_{f(i,j)}^{(m,s)},$$

respectively. The total energy $C^{(m,s)}$ of f is a matching evaluation equation, and can be defined as the sum of $$C_{(i,j)}^{(m,s)}$$

as shown in the following equation (8).

$$C_f^{(m,s)} = \sum_{i=0}^{i=2^m-1} \sum_{j=0}^{j=2^m-1} C_{(i,j)}^{(m,s)} \qquad (8)$$

[1. 3. 2. 2] Cost Related to the Locations of the Pixel for Smooth Mapping

In order to obtain smooth mappings, another energy $D_f$ for the mapping is introduced. The energy $D_f$ is determined by the locations of $$p_{(i,j)}^{(m,s)} \text{ and } q_{f(i,j)}^{(m,s)}$$

(i=0, 1, ..., $2^m-1$, j=0, ... $2^m-1$), regardless of the intensity of the pixels. The energy $$D_{(i,j)}^{(m,s)}$$

of the mapping $f^{(m,s)}$ at a point (i,j) is determined by the following equation (9).

$$D_{(i,j)}^{(m,s)} = \eta E_{0(i,j)}^{(m,s)} + E_{1(i,j)}^{(m,s)} \qquad (9)$$

where the coefficient parameter η which is equal to or greater than 0 is a real number. And we have $$E_{0(i,j)}^{(m,s)} = \|(i, j) - f^{(m,s)}(i, j)\|^2 \qquad (10)$$

$$E_{1(i,j)}^{(m,s)} = \sum_{i'=i-1}^{i} \sum_{j'=j-1}^{j} \|(f^{(m,s)}(i,j) - (i,j)) - (f^{(m,s)}(i',j') - (i',j'))\|^2 / 4 \qquad (11)$$

where $$\|(x,y)\| = \sqrt{x^2 + y^2} \qquad (12),$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \qquad (13)$$

[1. 3. 2. 3] Total Energy of the Mapping

The total energy of the mapping, that is, a combined evaluation equation which relates to the combination of a plurality of evaluations, is defined as $$\lambda C_f^{(m,s)} + D_f^{(m,s)},$$

where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \qquad (14)$$

Care must be exercised in that the mapping becomes an identity mapping if λ=0 and η=0 (i.e., $f^{(m,s)}$ (i,j)=(i,j) for all i=0, 1, ... $2^m-1$ and j=0, 1, ..., $2^m-1$). As will be described later, the mapping can be gradually modified or transformed from an identity mapping since the case of λ=0 and η=0 is evaluated at the outset in the base technology. If the combined evaluation equation is defined as $$C_f^{(m,s)} + \lambda D_f^{(m,s)}$$

where the original position of λ is changed as such, the equation with λ=0 and η=0 will be $$C_f^{(m,s)}$$

only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1. 3. 3] Determining the Mapping With Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \tag{15}$$

where $\lfloor x \rfloor$ denotes the largest integer not exceeding x, $$p_{(i',j')}^{(m-1,s)} \text{ and } q_{(i',j')}^{(m-1,s)}$$

are respectively called the parents of $$p_{(i,j)}^{(m,s)}$$

and $$q_{(i,j)}^{(m,s)}.$$

Conversely, $$p_{(i,j)}^{(m,s)} \text{ and } q_{(i,j)}^{(m,s)}$$

are the child of $$p_{(i',j')}^{(m-1,s)}$$

and the child of $$q_{(i',j')}^{(m-1,s)},$$

respectively. A function parent (i,j) is defined by the following equation (16):

$$\text{parent}(i, j) = \left(\left\lfloor \frac{i}{2} \right\rfloor, \left\lfloor \frac{j}{2} \right\rfloor\right) \tag{16}$$

Now, a mapping between $$p_{(i,j)}^{(m,s)} \text{ and } q_{(k,l)}^{(m,s)}$$

is determined by computing the energy and finding the minimum thereof. The value of $f^{(m,s)}(i,j)=(k,l)$ is determined as follows using f(m−1,s) (m=1, 2, . . . , n). First of all, a condition is imposed that $$q_{(k,l)}^{(m,s)}$$

should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \tag{17}$$

where $$g^{(m,s)}(i, j) = f^{(m-1,s)}(\text{parent}(i, j)) + f^{(m-1,s)}(\text{parent}(i, j) + (1, 1)) \tag{18}$$

The quadrilateral defined above is hereinafter referred to as the inherited quadrilateral of $$p_{(i,j)}^{(m,s)}.$$

The pixel minimizing the energy is sought and obtained inside the inherited quadrilateral.

Figure 3:
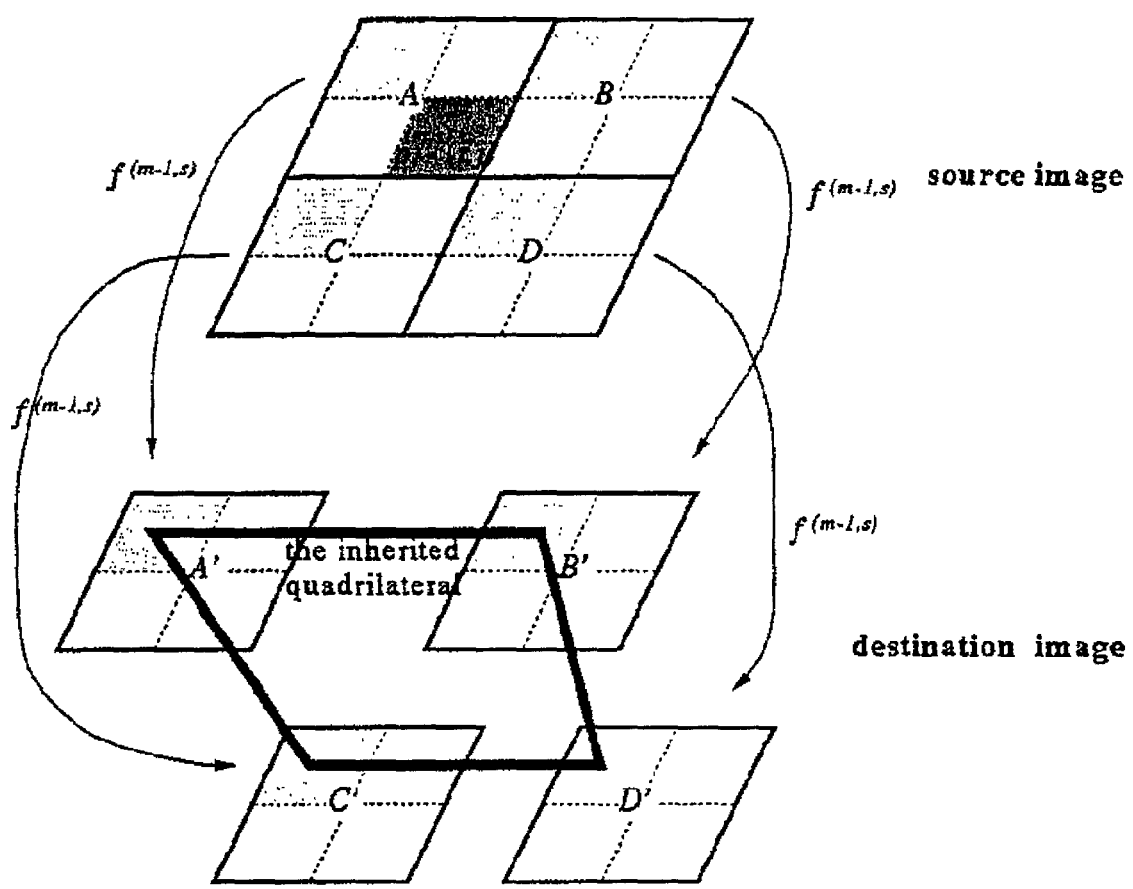
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $$p_{(i,j)}^{(m,s)}$$

should be mapped to the pixel $$q_{f^{(m)}(i,j)}^{(m,s)}$$

which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0_{(i,j)}} = \|f^{(m,0)}(i,j) - g^{(m)}(i,j)\|^2 \tag{19}$$

$$E_{0_{(i,j)}} = \|f^{(m,s)}(i,j) - f^{(m,s-1)}(i,j)\|^2, (1 \leq i) \tag{20}$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m–1) the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $$L_{max}^{(m)}.$$

$$L_{max}^{(m)}$$

is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1. 4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $$C_f^{(m,s)}$$

for each submapping generally becomes smaller. This basically means that the two images are matched better. However, if $\lambda$ exceeds the optimal value, the following phenomena occur:

1. Pixels which should not be corresponded are erroneously corresponded only because their intensities are close.
2. As a result, correspondence between images becomes inaccurate, and the mapping becomes invalid.
3. As a result, $$D_f^{(m,s)}$$

in equation (14) tends to increase abruptly.
4. As a result, since the value of equation (14) tends to increase abruptly, $f^{(m,s)}$ changes in order to suppress the abrupt increase of $$D_f^{(m,s)}.$$

As a result, $$C_f^{(m,s)}$$

increases.

Therefore, a threshold value at which $$C_f^{(m,s)}$$

turns to an increase from a decrease is detected while a state in which equation (14) takes the minimum value with $\lambda$ being increased is kept. Such $\lambda$ is determined as the optimal value at $\eta=0$. Next, the behavior of $$C_f^{(m,s)}$$

is examined while $\eta$ is increased gradually, and $\eta$ will be automatically determined by a method described later. $\lambda$ will then again be determined corresponding to such an automatically determined $\eta$.

The above-described method resembles the focusing mechanism of human visual systems. In the human visual systems, the images of the respective right eye and left eye are matched while moving one eye. When the objects are clearly recognized, the moving eye is fixed.

[1. 4. 1] Dynamic Determination of λ

Initially, λ is increased from 0 at a certain interval, and a subimage is evaluated each time the value of λ changes. As shown in equation (14), the total energy is defined by $$\lambda C_f^{(m,s)} + D_f^{(m,s)}.$$

$D_{(i,j)}^{(m,s)}$ in equation (9) represents the smoothness and theoretically becomes minimum when it is the identity mapping $E_0$ and $E_1$ increase as the mapping is further distorted. Since $E_1$ is an integer, 1 is the smallest step of $D_f^{(m,s)}.$ Thus, it is impossible to change the mapping to reduce the total energy unless a changed amount (reduction amount) of the current $\lambda C_{(i,j)}^{(m,s)}$ is equal to or greater than 1. Since $D_f^{(m,s)}$ increases by more than 1 accompanied by the change of the mapping, the total energy is not reduced unless $\lambda C_{(i,j)}^{(m,s)}$ is reduced by more than 1.

Under this condition, it is shown that $C_{(i,j)}^{(m,s)}$ decreases in normal cases as λ increases. The histogram of $C_{(i,j)}^{(m,s)}$ is denoted as h(l), where h(l) is the number of pixels whose energy $C_{(i,j)}^{(m,s)}$ is $l^2$. In order that $\lambda l^2 \leq 1$ for example, the case of $l^2 = 1/\lambda$ is considered. When λ varies from $\lambda_1$ to $\lambda_2$, a number of pixels (denoted A) expressed by the following equation (21):

$$A = \sum_{l=\lceil \frac{1}{\lambda_2} \rceil}^{\lfloor \frac{1}{\lambda_1} \rfloor} h(l) \cong \int_{l=\frac{1}{\lambda_2}}^{\frac{1}{\lambda_1}} h(l) dl = -\int_{\lambda_2}^{\lambda_1} h(l) \frac{1}{\lambda^{3/2}} d\lambda = \int_{\lambda_1}^{\lambda_2} \frac{h(l)}{\lambda^{3/2}} d\lambda \quad (21)$$

changes to a more stable state having the energy shown in equation (22):

$$C_f^{(m,s)} - l^2 = C_f^{(m,s)} - \frac{1}{\lambda}. \quad (22)$$

Here, it is assumed that the energy of these pixels is approximated to be zero. This means that the value of $C_{(i,j)}^{(m,s)}$ changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since h(l)>0, $C_f^{(m,s)}$ decreases in the normal case. However, when λ exceeds the optimal value, the above phenomenon, that is, an increase in $C_f^{(m,s)}$ occurs. The optimal value of λ is determined by detecting this phenomenon.

When $$h(l) = Hl^k = \frac{H}{\lambda^{k/2}} \quad (25)$$

is assumed, where both H(H>0) and k are constants, the equation (26) holds:

$$\frac{\partial C_f^{(m,s)}}{\partial \lambda} = -\frac{H}{\lambda^{5/2+k/2}} \qquad (26)$$

Then, if k≠−3, the following equation (27) holds:

$$C_f^{(m,s)} = C + \frac{H}{(3/2+k/2)\lambda^{3/2+k/2}} \qquad (27)$$

The equation (27) is a general equation of $$C_f^{(m,s)}$$

(where C is a constant).

When detecting the optimal value of λ, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \qquad (28)$$

holds, the number of pixels violating the BC increases at a rate of:

Thus, $$B_0 = \frac{h(l)p_0}{\lambda^{3/2}} \qquad (29)$$

Thus, $$\frac{B_0 \lambda^{3/2}}{p_0 h(l)} = 1 \qquad (30)$$

is a constant. If it is assumed that $h(l)=Hl^k$, the following equation (31), for example, $$B_0 \lambda^{3/2+k/2} = p_0 H \qquad (31)$$

becomes a constant. However, when λ exceeds the optimal value, the above value of equation (31) increases abruptly. By detecting this phenomenon, i.e. whether or not the value of $B_0 \lambda^{3/2+k/2}/2^m$ exceeds an abnormal value $B_{0thres}$, the optimal value of λ can be determined. Similarly, whether or not the value of $B_1 \lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1thres}$. The two threshold values $B_{0thres}$ and $B_{1thres}$ can be used to detect excessive distortion of the mapping which may not be detected through observation of the energy $$C_f^{(m,s)}.$$

In the experimentation, when λ exceeded 0.1 the computation of $f^{(m,s)}$ was stopped and the computation of $f^{(m,s+1)}$ was started. That is because the computation of submappings is affected by a difference of only 3 out of 255 levels in pixel intensity when λ>0.1 and it is then difficult to obtain a correct result.

[1. 4. 2] Histogram h(l)

The examination of $$C_f^{(m,s)}$$

does not depend on the histogram h(l), however, the examination of the BC and its third condition may be affected by h(l). When $$(\lambda, C_f^{(m,s)})$$

is actually plotted, k is usually close to 1. In the experiment, k=1 is used, that is, $B_0 \lambda^2$ and $B_1 \lambda^2$ are examined. If the true value of k is less than 1, $B_0 \lambda^2$ and $B_1 \lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object, with its center at $(x_0,y_0)$ and its radius r, given by:

$$p(i,j) = \qquad (32)$$
$$\begin{cases} \frac{255}{r}c\left(\sqrt{(i-x_0)^2+(j-y_0)^2}\right) & \ldots \left(\sqrt{(i-x_0)^2+(j-y_0)^2}\leq r\right) \\ 0 & \ldots \text{(otherwise)} \end{cases}$$

and the destination image given by:

$$q(i,j) = \qquad (33)$$
$$\begin{cases} \frac{255}{r}c\left(\sqrt{(i-x_1)^2+(j-y_1)^2}\right) & \ldots \left(\sqrt{(i-x_1)^2+(j-y_1)^2}\leq r\right) \\ 0 & \ldots \text{(otherwise)} \end{cases}$$

with its center at $(x_1,y_1)$ and radius r. In the above, let c(x) have the form of $c(x)=x^k$. When the centers $(x_0,y_0)$ and $(x_1,y_1)$ are sufficiently far from each other, the histogram h(l) is then in the form:

$$h(l) \propto rl^k (k \neq 0) \qquad (34)$$

When k=1, the images represent objects with clear boundaries embedded in the background. These objects become darker toward their centers and brighter toward their boundaries. When k=−1, the images represent objects with vague boundaries. These objects are brightest at their centers, and become darker toward their boundaries. Without much loss of generality, it suffices to state that objects in images are generally between these two types of objects. Thus, choosing k such that $-1 \leq k \leq 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1. 4. 3] Dynamic Determination of $\eta$

The parameter $\eta$ can also be automatically determined in a similar manner. Initially, $\eta$ is set to zero, and the final mapping $f^{(n)}$ and the energy $C_f^{(n)}$ at the finest resolution are computed. Then, after $\eta$ is increased by a certain value $\Delta\eta$, the final mapping $f^{(n)}$ and the energy $$C_f^{(n)}$$

at the finest resolution are again computed. This process is repeated until the optimal value of $\eta$ is obtained. $\eta$ represents the stiffness of the mapping because it is a weight of the following equation (35):

$$E_{0(i,j)}^{(m,s)} = \|f^{(m,s)}(i,j) - f^{(m,s-1)}(i,j)\|^2 \qquad (35)$$

Figure 4:
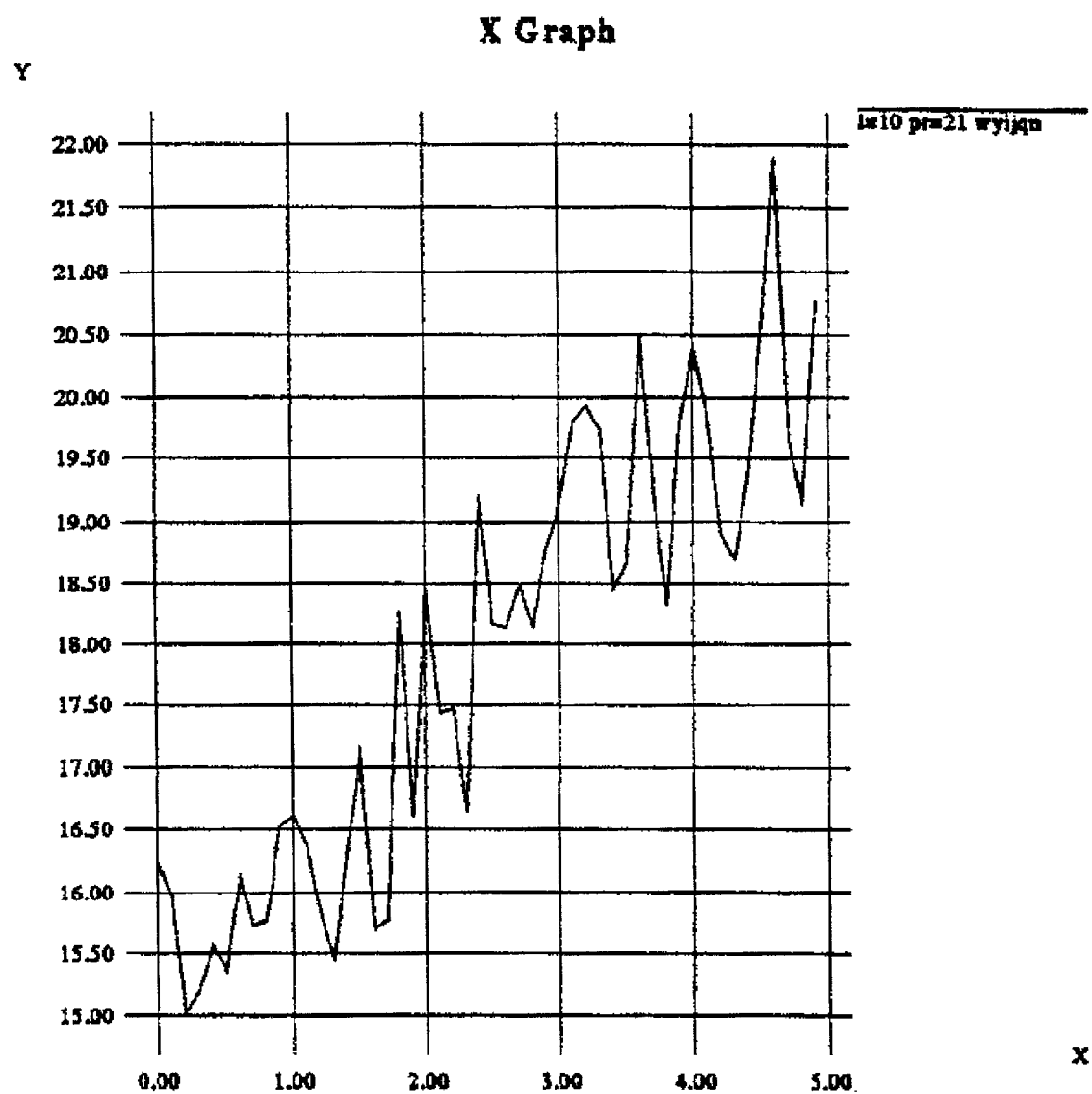
FIG. 4 shows the relationship between a parameter η (represented by x-axis) and energy $C_f$ (represented by y-axis)

If $\eta$ is zero, $$D_f^{(n)}$$

is determined irrespective of the previous submapping, and the present submapping may be elastically deformed and become too distorted. On the other hand, if $\eta$ is a very large value, $$D_f^{(n)}$$

is almost completely determined by the immediately previous submapping. The submappings are then very stiff, and the pixels are mapped to almost the same locations. The resulting mapping is therefore the identity mapping. When the value of $\eta$ increases from 0, $$C_f^{(n)}$$

gradually decreases as will be described later. However, when the value of $\eta$ exceeds the optimal value, the energy starts increasing as shown in FIG. 4. In FIG. 4, the x-axis represents $\eta$, and y-axis represents $C_f$.

The optimum value of $\eta$ which minimizes $$C_f^{(n)}$$

can be obtained in this manner. However, since various elements affect this computation as compared to the case of $\eta$, $$C_f^{(n)}$$

changes while slightly fluctuating. This difference is caused because a submapping is re-computed once in the case of $\lambda$ whenever an input changes slightly, whereas all the submappings must be re-computed in the case of $\lambda$. Thus, whether the obtained value of $$C_f^{(n)}$$

is the minimum or not cannot be determined as easily. When candidates for the minimum value are found, the true minimum needs to be searched by setting up further finer intervals.

[1. 5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f^{(m,s)}(i,j)}^{(m,s)}) \qquad (36)$$

That is, supersampling is performed. In an example implementation, $f^{(m,s)}$ may take integer and half integer values, and $$V(q_{(i,j)+(0.5,0.5)}^{(m,s)}) \qquad (37)$$

is given by $$(V(q_{(i,j)}^{(m,s)}) + V(q_{(i,j)+(1,1)}^{(m,s)}))/2 \qquad (38)$$

[1. 6] Normalization of the pixel intensity of each image

When the source and destination images contain quite different objects, the raw pixel intensity may not be used to compute the mapping because a large difference in the pixel intensity causes excessively large energy $$C_f^{(m,s)}$$

and thus making it difficult to obtain an accurate evaluation.

For example, a matching between a human face and a cat's face is computed as shown in FIGS. 20(a) and 20(b). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1.7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$ since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)(i,j)}$ (m=0, . . . ,n) that satisfy the BC are chosen as much as possible from the candidates (k,l) by imposing a penalty on the candidates violating the BC. The energy $D_{(k,l)}$ of a candidate that violates the third condition of the BC is multiplied by $\phi$ and that of a candidate that violates the first or second condition of the BC is multiplied by $\psi$. In this implementation, $\phi$=2 and $\psi$=100000 are used.

In order to check the above-mentioned BC, the following test may be performed as the procedure when determining (k,l)=$f^{(m,s)}(i,j)$ Namely, for each grid point (k,l) in the inherited quadrilateral of $f^{(m,s)}(i,j)$, whether or not the z-component of the outer product of $$W = \vec{A} \times \vec{B} \quad (39)$$

is equal to or greater than 0 is examined, where $$\vec{A} = \overrightarrow{q^{(m,s)}_{f(m,s)(i,j-1)} q^{(m,s)}_{f(m,s)(i+1,j-1)}} \quad (40)$$

$$\vec{B} = \overrightarrow{q^{(m,s)}_{f(m,s)(i,j-1)} q^{(m,s)}_{(k,l)}} \quad (41)$$

Here, the vectors are regarded as 3D vectors and the z-axis is defined in the orthogonal right-hand coordinate system. When W is negative, the candidate is imposed with a penalty by multiplying $$D^{(m,s)}_{(k,l)}$$

by $\psi$ so that it is not as likely to be selected.

Figure 5A:
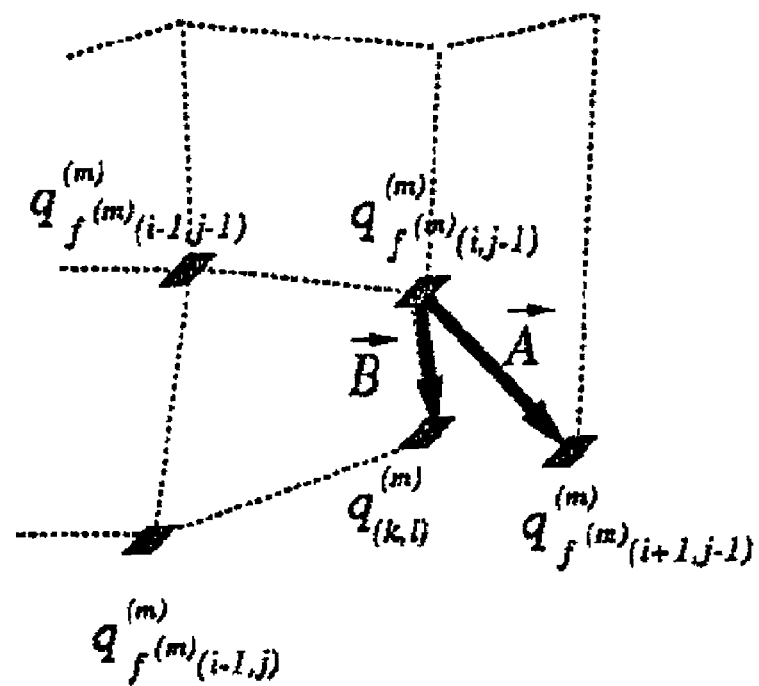
FIG. 5(a) is a diagram illustrating determination of whether or not the mapping for a certain point satisfies the bijectivity condition through the outer product computation.
Figure 5B:
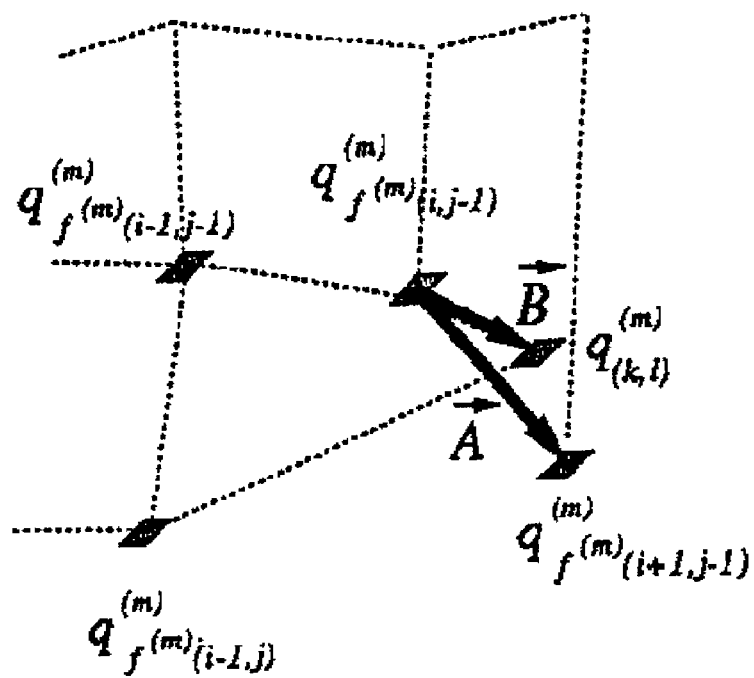
FIG. 5(b) is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}(i,j+1)$ for the adjacent pixel at there is no pixel on the source image plane that satisfies the BC if the z-component of W is negative because then $$q^{(m,s)}_{(k,l)}$$

passes the boundary of the adjacent quadrilateral.

[1. 7. 1] The Order of Submappings

In this implementation, $\sigma(0)$=0, $\sigma(1)$=1, $\sigma(2)$=2, $\sigma(3)$=3, $\sigma(4)$=0 are used when the resolution level is even, while $\sigma(0)$=3, $\sigma(1)$=2, $\sigma(2)$=1, $\sigma(3)$=0, $\sigma(4)$=3 are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1. 8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x,y,t) (0≦x≦N−1, 0≦y≦M−1) whose distance from the source image plane is t (0≦t≦1) are obtained as follows. First, the location of the pixel r(x,y,t), where x,y,t∈R, is determined by equation (42):

$$(x, y) = (1 - dx)(1 - dy)(1 - t)(i, j) + (1 - dx)(1 - dy)tf(i, j) + \quad (42)$$
$$dx(1 - dy)(1 - t)(i + 1, j) + dx(1 - dy)tf(i + 1, j) +$$
$$(1 - dx)dy(1 - t)(i, j + 1) + (1 - dx)dytf(i, j + 1) +$$
$$dxdy(1 - t)(i + 1, j + 1) + dxdytf(i + 1, j + 1)$$

The value of the pixel intensity at r(x,y,t) is then determined by equation (43):

$$V(r(x, y, t)) = (1 - dx)(1 - dy)(1 - t)V(p_{(i,j)}) + \quad (43)$$
$$(1 - dx)(1 - dy)tV(q_{f(i,j)}) + dx(1 - dy)(1 - t)$$
$$V(p_{(i+1,j)}) + dx(1 - dy)tV(q_{f(i+1,j)}) +$$
$$(1 - dx)dy(1 - t)V(p_{(i,j+1)}) + (1 - dx)$$

-continued
$$dytV(q_{f(i,j+1)}) + dxdy(1-t)V(p_{(i+1,j+1)}) + dxdytV(q_{f(i+1,j+1)})$$

where dx and dy are parameters varying from 0 to 1.

[1. 9] Mapping to Which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0, j_0), p(i_1, j_1), \ldots, p(i_{n_s-1}, j_{n_s-1}) \quad (44)$$

of the source image are specified, the following values in the equation (45) are determined.

$$F^{(n)}(i_0,j_0)=(k_0,l_0), F^{(n)}(i_1,j_1)=(k_1,l_1), \ldots, F^{(n)}(i_{n_s-1}, j_{n_s-1})=(k_{n_s-1}, l_{n_s-1}) \quad (45)$$

For the remaining pixels of the source image, the amount of displacement is the weighted average of the displacement of $P(i_h, j_h)$ (h=0, ..., n,−1). Namely, a pixel P(i,j) is mapped to the following pixel (expressed by the equation (46)) of the destination image.

$$F^{(m)}(i,j) = \frac{(i,j) + \sum_{h=0}^{h=n_s-1}(k_h - i_h, l_h - j_h)weight_h(i,j)}{2^{n-m}} \quad (46)$$

where $$weight_h(i,j) = \frac{1/\|(i_h - i, j_h - j)\|^2}{total\_weight(i,j)} \quad (47)$$

where $$total\_weight(i,j) = \sum_{h=0}^{h=n_s-1} 1/\|(i_h - i, j_h - j)\|^2 \quad (48)$$

where

Second, the energy $$D_{(i,j)}^{(m,s)}$$

of the candidate mapping f is changed so that a mapping f similar to $F^{(m)}$ has a lower energy. Precisely speaking, $$D_{(i,j)}^{(m,s)}$$

is expressed by the equation (49):

$$D_{(i,j)}^{(m,s)} = E_{0(i,j)}^{(m,s)} + \eta E_{1(i,j)}^{(m,s)} + \kappa E_{2(i,j)}^{(m,s)} \quad (49)$$

where $$E_{2(i,j)}^{(m,s)} = \begin{cases} 0, \text{ if } \|F^{(m)}(i,j) - f^{(m,s)}(i,j)\|^2 \leq \left\lfloor \frac{\rho^2}{2^{2(n-m)}} \right\rfloor \\ \|F^{(m)}(i,j) - f^{(m,s)}(i,j)\|^2, \text{ otherwise} \end{cases} \quad (50)$$

where $\kappa, \rho \geq 0$. Finally, the resulting mapping f is determined by the above-described automatic computing process.

Note that $$E_{2(i,j)}^{(m,s)}$$

becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \quad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
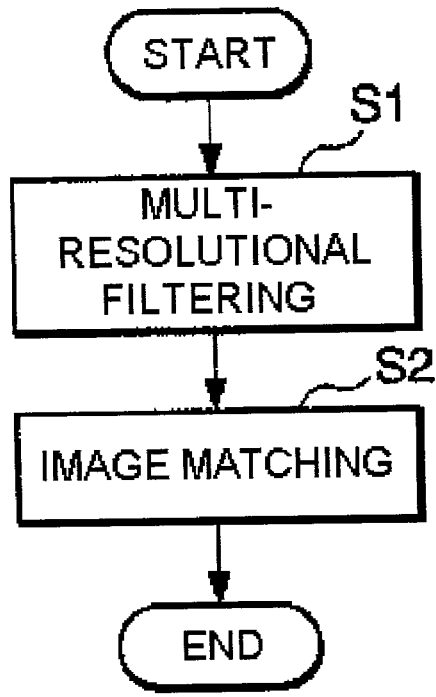
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
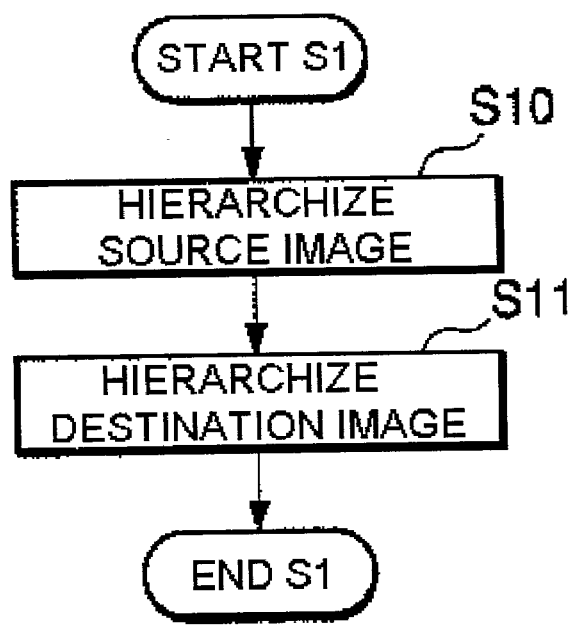
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
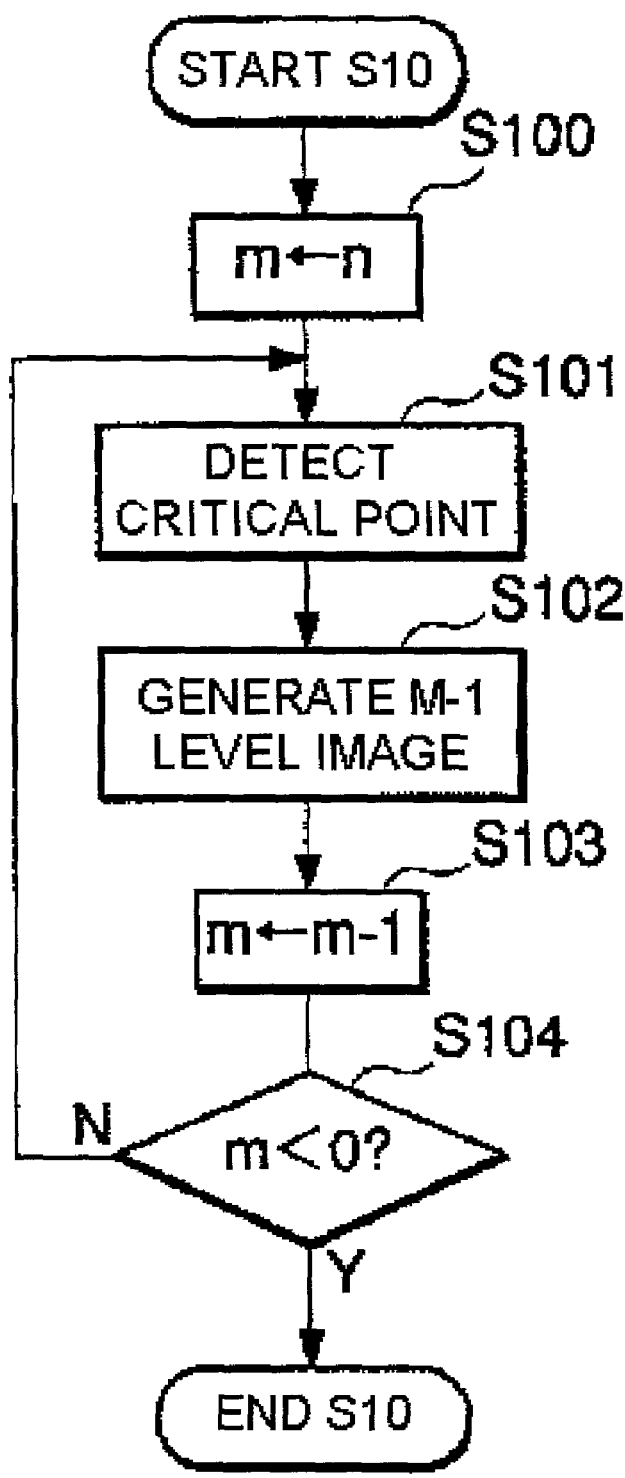
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ and $p^{(m-1,3)}$ the m-th level of resolution, using a critical point filter (S101), so that the images $p^{(m-1,0)}$, $p^{(m-1,1)} p^{(m-1,0)}$ and $p^{(m-1,3)}$ of the (m−1)th level are generated (S102). Since m=n here, $p^{(m,0)} = p^{(m,1)} = p^{(m,2)} = p^{(m,3)} = p^{(n)}$ holds and four types of subimages are thus generated from a single source image.

Figure 9:
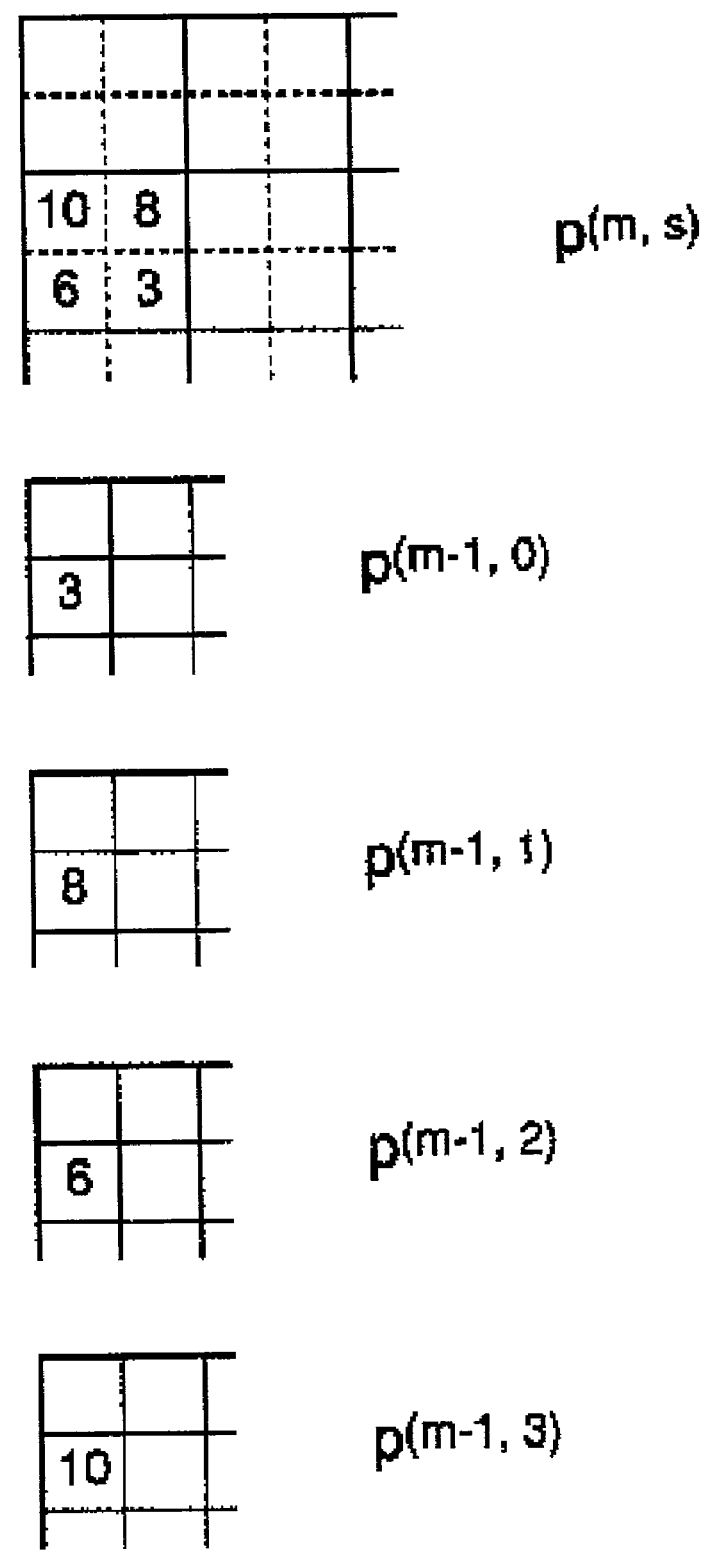

FIG. 9 shows correspondence between partial images of the m-th and those of (m−1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$ and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m,-1,0)}$, $p^{(m,-1,1)}$, $p^{(m,-1,2)}$ and $p^{(m,-1,3)}$ acquire "3", "8", "6" and "10", respectively, according to the rules described in [1.2]. This block at the m-th level is replaced at the (m−1)th level by respective single pixels thus acquired. Therefore, the size of the subimages at the (m−1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
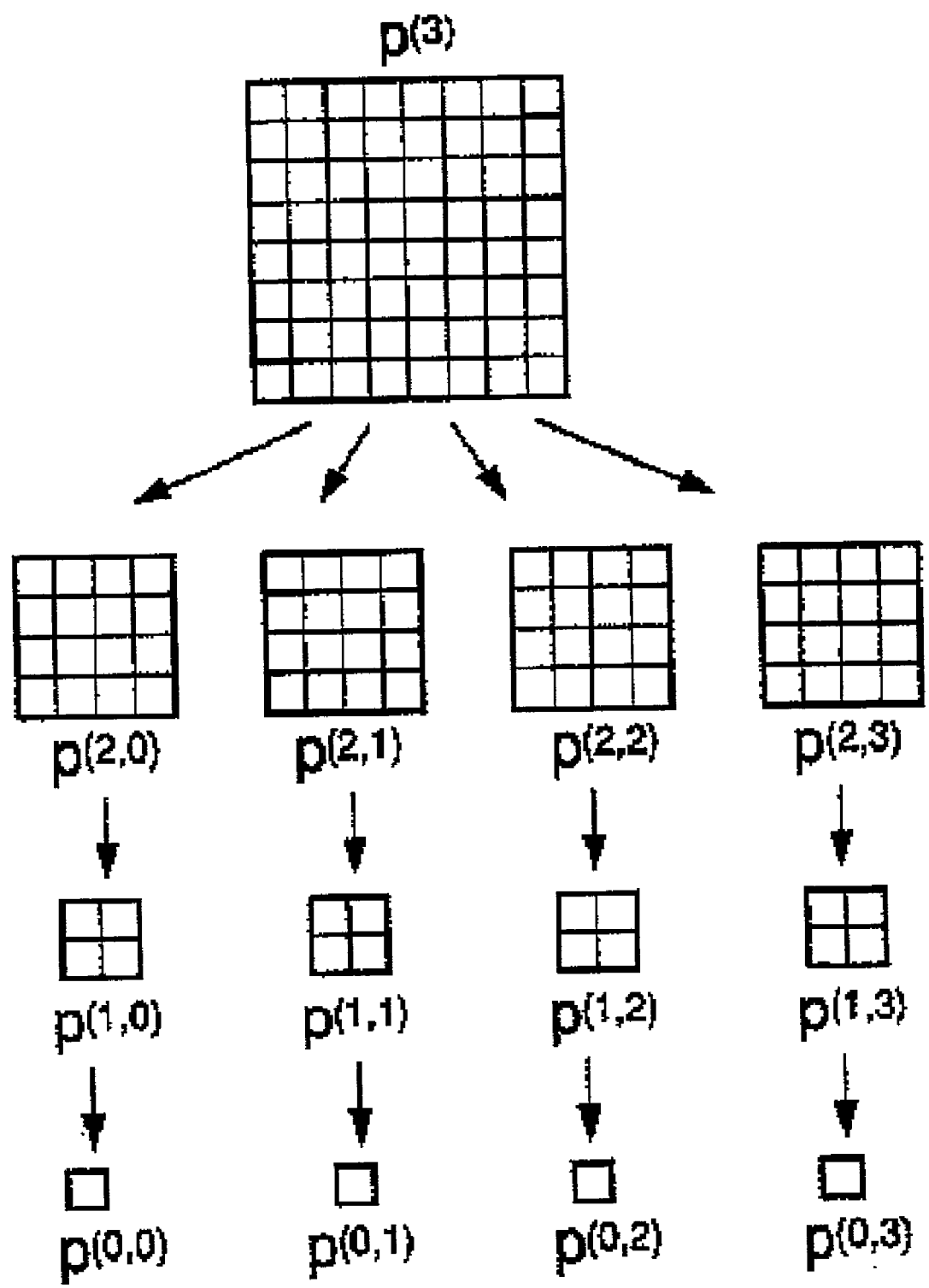
FIG. 10 is a diagram showing source images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
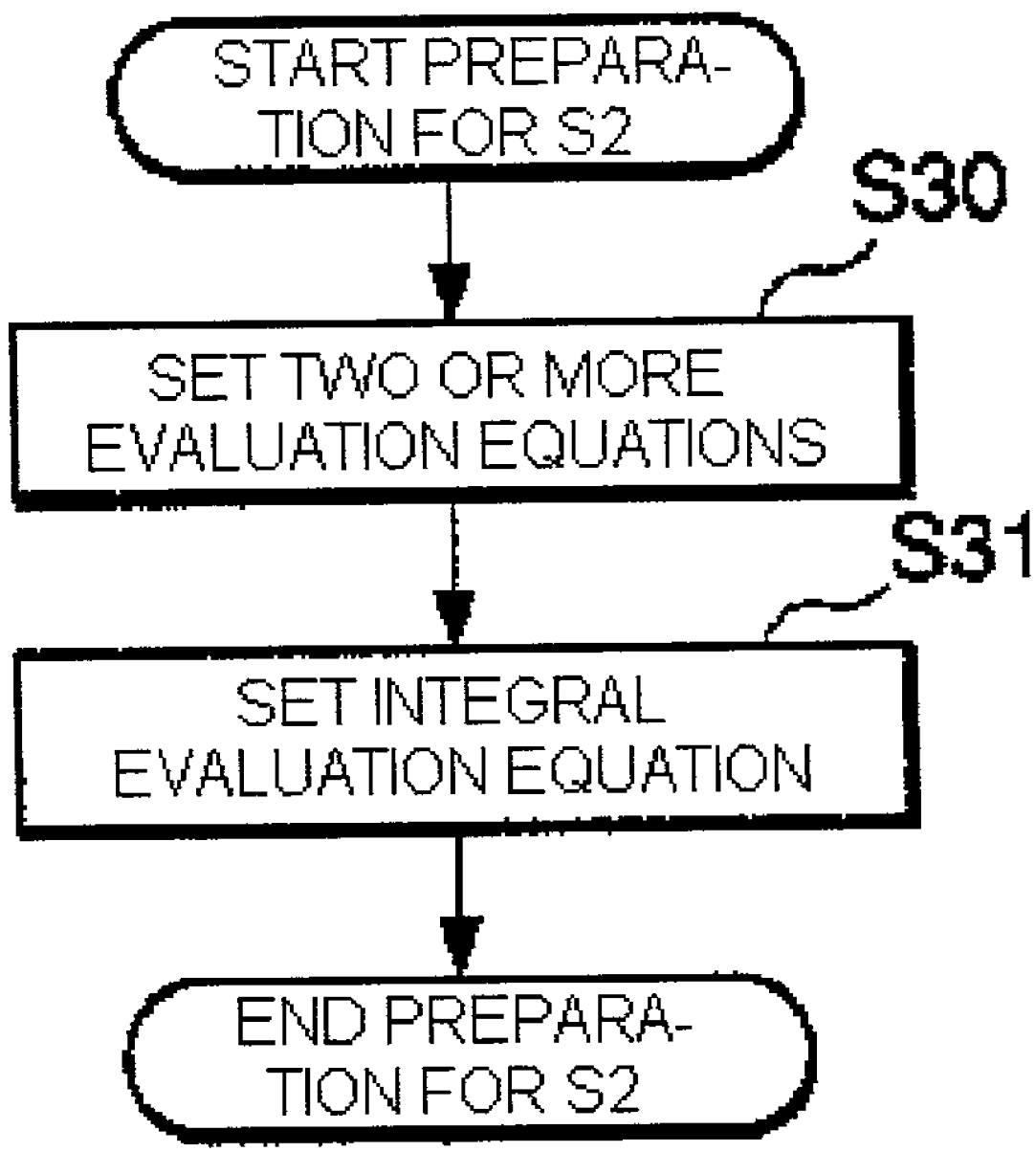
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $$C_f^{(m,s)}$$

concerning a pixel value, introduced in [1.3.2.1], and the energy $$D_f^{(m,s)}$$

concerning the smoothness of the mapping introduced in [1.3.2.2]. Next, by combining these evaluation equations, a combined evaluation equation is set (S31). Such a combined evaluation equation may be $$\lambda C_{(i,j)}^{(m,s)} + D_f^{(m,s)}.$$

Using η introduced in [1.3.2.2], we have $$\sum \sum \left( \lambda C_{(i,j)}^{(m,s)} + \eta E_{0(i,j)}^{(m,s)} + E_{1(i,j)}^{(m,s)} \right) \quad (52)$$

In the equation (52) the sum is taken for each i and j where i and j run through 0, 1, ..., $2^{m-1}$. Now, the preparation for matching evaluation is completed.

Figure 12:
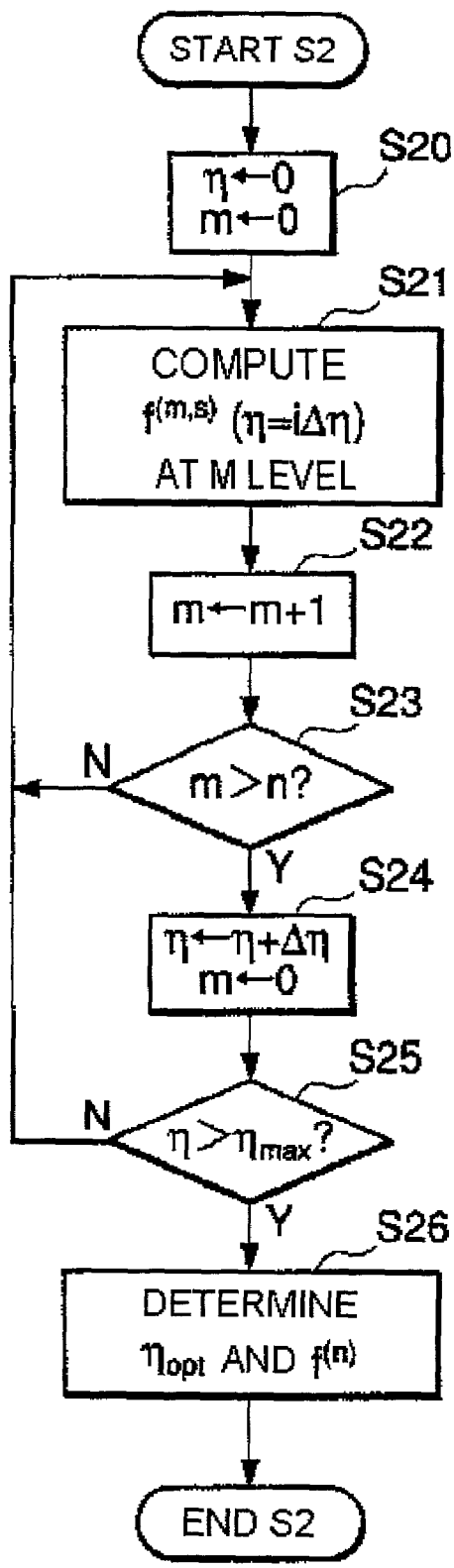
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$(s=0, 1, 2, 3) which satisfy the BC and minimize the energy are obtained (S21). The BC is checked by using the inherited quadrilateral described in [1.3.3]. In that case, the submappings at the m-th level are constrained by those at the (m−1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained subamppings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
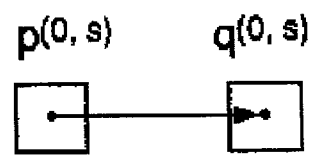
FIG. 13 is a diagram showing the way a submapping is determined at the 0-th level.
Figure 14:
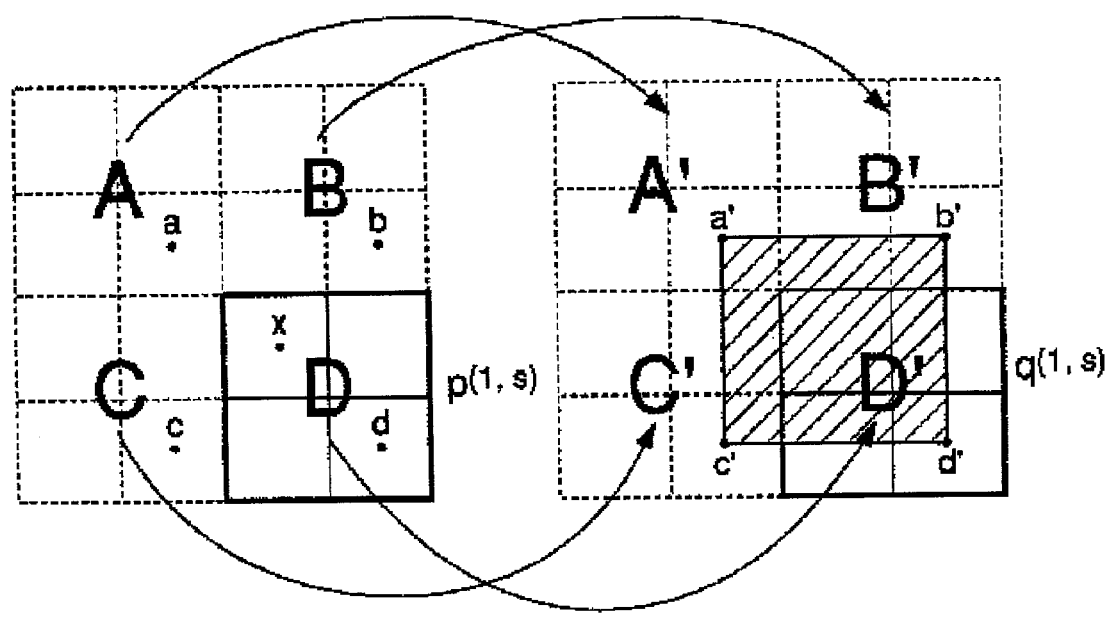
FIG. 14 is a diagram showing the way a submapping is determined at the first level.

FIG. 13 illustrates how the submapping is determined at the 0-th level. Since at the 0-th level each sub-image is consititued by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}(\eta=0)$ because it has been determined relative to $\eta=0$.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}$ ($\eta=\Delta\eta$) relative to the new $\eta$ is obtained. This process is repeated while obtaining $f^{(n)}$ ($\eta=i\Delta\eta$) (i=0, 1, ... ) at S21. When $\eta$ exceeds $\eta_{max}$, the process proceeds to S26 and the optimal $\eta=\eta_{opt}$ is determined using a method described later, so as to let $f^{(n)}(\eta=\eta_{opt})$ be the final mapping $f^{(n)}$.

Figure 15:
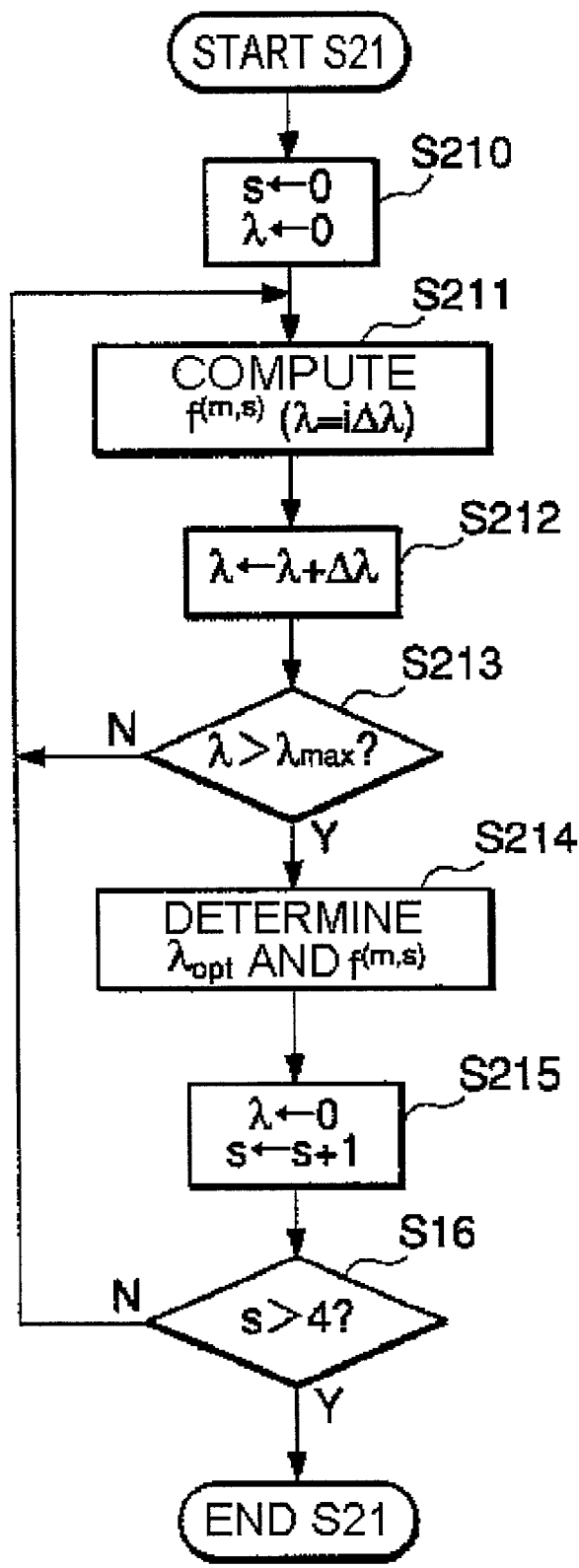
FIG. 15 is a flowchart showing the details of the process at S21 in FIG. 6.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}(\lambda=0)$. In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}(\lambda=\Delta\lambda)$ relative to the new $\lambda$ is obtained. This process is repeated while obtaining $f^{(m,s)}(\lambda=i\Delta\lambda)(i=0,1, ... )$. When $\lambda$ exceeds $\lambda_{max}$, the process proceeds to S214 and the optimal $\lambda=\lambda_{opt}$ is determined, so as to let $f^{(n)}(\lambda=\lambda_{opt})$ be the final mapping $f^{(m,s)}$(S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
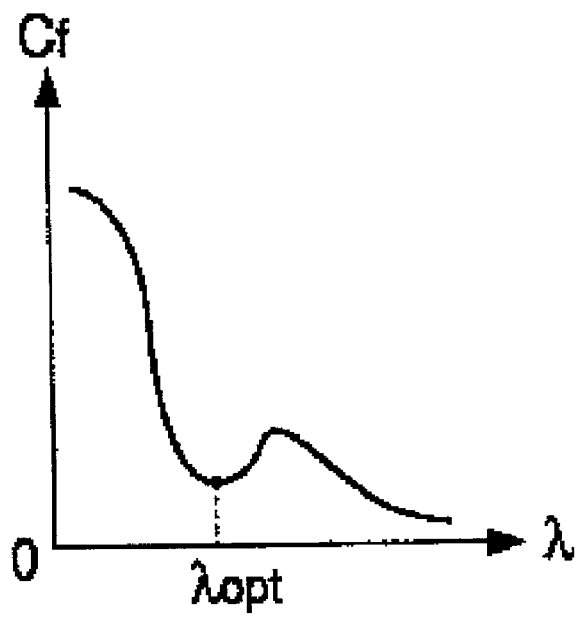
FIG. 16 is a graph showing the behavior of energy $C_f^{(m,s)}$ corresponding to $f^{(m,s)}$ ($\lambda=i\Delta\lambda$) which has been obtained for a certain $f^{(m,s)}$ while changing λ.

FIG. 16 shows the behavior of the energy $$C_f^{(m,s)}$$

corresponding to $f^{(m,s)}(\lambda=i\Delta\lambda)$ (i=0,1, ... ) for a certain m and s while varying $\lambda$. As described in [1.4], as $\lambda$ increases, $$C_f^{(m,s)}$$

normally decreases but changes to increase after $\lambda$ exceeds the optimal value. In this base technology, $\lambda$ in which $$C_f^{(m,s)}$$

becomes the minima is defined as $\lambda_{opt}$. As observed in FIG. 16, even if $$C_f^{(m,s)}$$

begins to decrease again in the range $\lambda > \lambda_{opt}$, the mapping will not be as good. For this reason, it suffices to pay attention to the first occurring minima value. In this base technology, $\lambda_{opt}$ is independently determined for each submapping including $f^{(n)}$.

Figure 17:
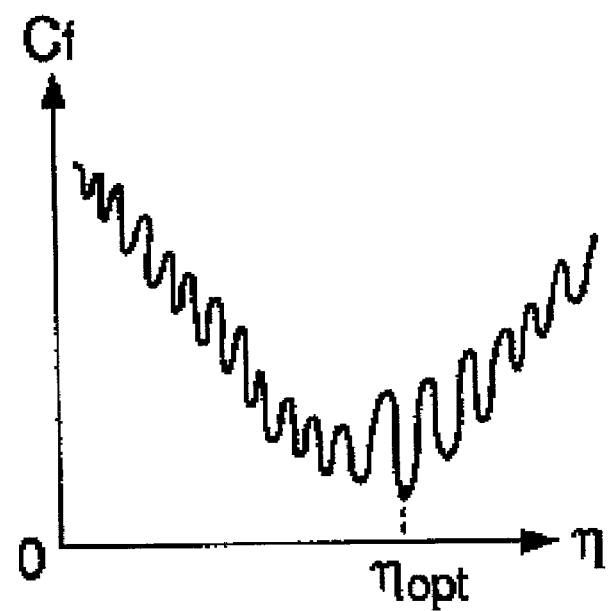
FIG. 17 is a diagram showing the behavior of energy $C_f^{(n)}$ corresponding to $f^{(n)}$ ($\eta=i\Delta\eta$)(i=0, 1, ...) which has been obtained while changing η.

FIG. 17 shows the behavior of the energy $$C_f^{(n)}$$

corresponding to $f^{(n)}(\eta = i\Delta\eta)$ (i=0,1, . . . ) while varying $\eta$. Here too, $$C_f^{(n)}$$

normally decreases as $\eta$ increases, but $$C_f^{(n)}$$

changes to increase after $\eta$ exceeds the optimal value. Thus, $\eta$ in which $$C_f^{(n)}$$

becomes the minima is defined as $\eta_{opt}$. FIG. 17 can be considered as an enlarged graph around zero along the horizontal axis shown in FIG. 4. Once $\eta_{opt}$ is determined, $f^{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot} = \alpha E_0 + E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{t,t}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $$C_f^{(m,s)}$$

takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0 + \beta E_1$, for example, may be used as the combined evaluation equation, where $\alpha + \beta = 1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes ¼. However, it is possible to suppose that one block consists of 3×3 pixels and critical points are searched in this 3×3 block, then the number of pixels will be ⅑ as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments for Image Effect or Image Interpolation

Some embodiments based on the above-described base technology are now described. Although each embodiment is described separately, it is not necessary to determine a clear boundary between embodiments and an element or function described in one embodiment may be combined with elements or functions of the other embodiments.

Embodiment 1

Figure 18:
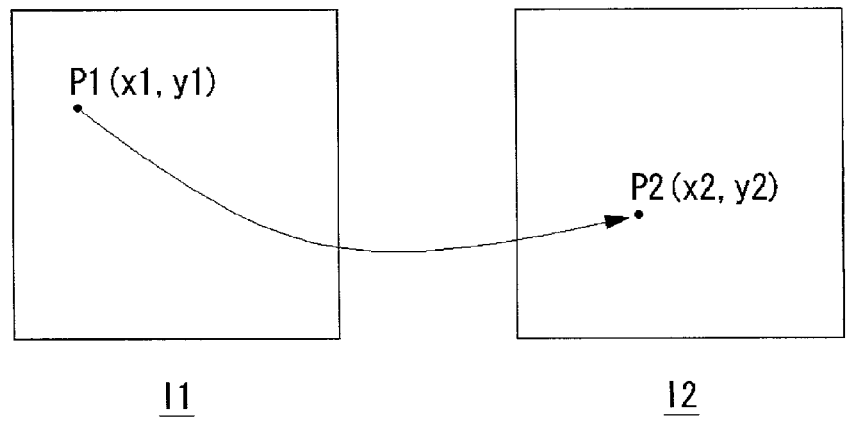
FIG. 18 shows how certain pixels correspond between a first image and a second image.

FIG. 18 shows a first image I1 and a second image I2, where certain pixels $p_1(x_1, Y_1)$ and $P_2(x_2, Y2)$ correspond therebetween. The correspondence of these pixels may be obtained using the base technology.

Figure 19:
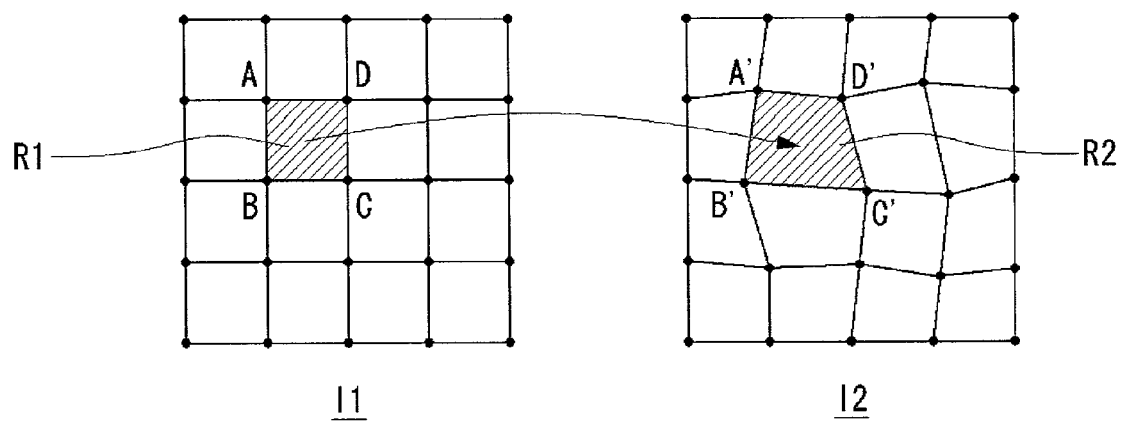
FIG. 19 shows a correspondence relation between a source polygon on the first image and a destination polygon on the second image.

Referring to FIG. 19, when a mesh is provided on the first image I1, a corresponding polygon mesh can be generated on the second image I2. Now, a polygon R1 of interest on the first image I1 is determined by four lattice points A, B, C and D. Let this polygon R1 be called a "source polygon." As has been shown in FIG. 18, these lattice points A, B, C and D have respectively corresponding points A', B', C' and D' on the second image I2, and a polygon R2 formed thus by the corresponding points is called a "destination polygon." In a particular case, the source polygon may be a rectangle while the destination polygon may be a quadrilateral. In the base technology a correspondence relation between images is described pixel-by-pixel, however, according to this embodiment, the correspondence relation between the first and second images is not described pixel by pixel, instead, corresponding points are described with respect to the lattice points of the source polygon. Such a description is written in a corresponding point file. By directing attention to the lattice points, the storage capacity required for, or size of, the corresponding point file can be reduced significantly.

The corresponding point file is utilized for generating an intermediate image or images related to the first image I1 and the second image I2. As this was described in the base technology section, intermediate images at arbitrary temporal or spatial positions can be generated by interpolating using the corresponding points. Thus, storing the first image I1, the second image I2 and the corresponding point file enables morphing and smooth motion pictures between two images, thus also providing a compression effect on motion pictures.

Figure 20:
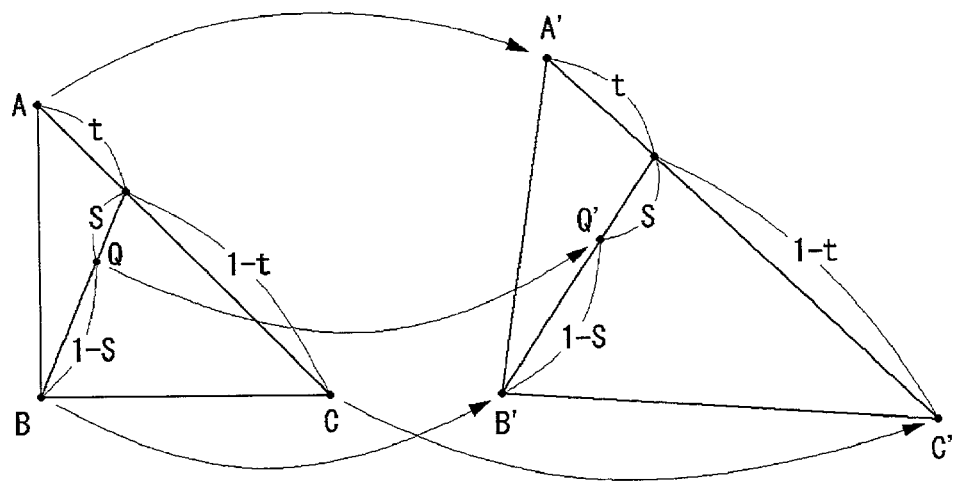
FIG. 20 illustrates a procedure for obtaining points in the destination polygon corresponding to points in the source polygon.

FIG. 20 shows a method by which to compute a correspondence relation regarding points other than the lattice points from the corresponding point file. Since the corresponding point file includes only information on the lattice points, data corresponding to interior points of the polygon may need to be computed separately. FIG. 20 shows a correspondence between a triangle ABC which corresponds to a lower half of the source polygon R1 shown in FIG. 19 and a triangle A'B'C' which corresponds to that of the destination polygon R2 shown in FIG. 19. Now, to determine a corresponding point for the point Q in triangle ABC, suppose that an intersection point of a line segment AC and an extension of a line BQ to intersect AC, passing through the interior point Q, interior-divides the line segment AC in the ratio t:(1−t) and the point Q interior-divides the extension of the line BQ between the line AC interior-dividing point and the point B in the ratio s:(1−s). in this way, a corresponding point Q' in triangle A'B'C' can be found by considering an intersection point of a line segment A'C' and an extended line of B'Q' to the A'C' through a corresponding point Q', which corresponds to the point Q, in a triangle A°B'C' in a destination polygon side interior-divides the line segment A'C', in the ratio t:(1−t) and the point Q' interior-divides a line segment connecting such the A'C' interior-dividing point and a point B' corresponding to B in the ratio s:(1−s). In this embodiment, it is preferable that the source polygon is divided into a triangle, and interior points of the destination polygon are determined in the form of interior division of vectors concerning the triangle. When expressed in a vector skew field, this becomes $$BQ=(1-s)\{(1-t)BA+tBC\},$$

thus, we have $$B'Q'=(1-s)\{(1-t)B'A'+tB'C'\}$$

Of course, a similar process can be performed on a triangle ACD which is an upper half of the source polygon R1 and a triangle A'C'D' which is that of the destination polygon R2.

Figure 21:
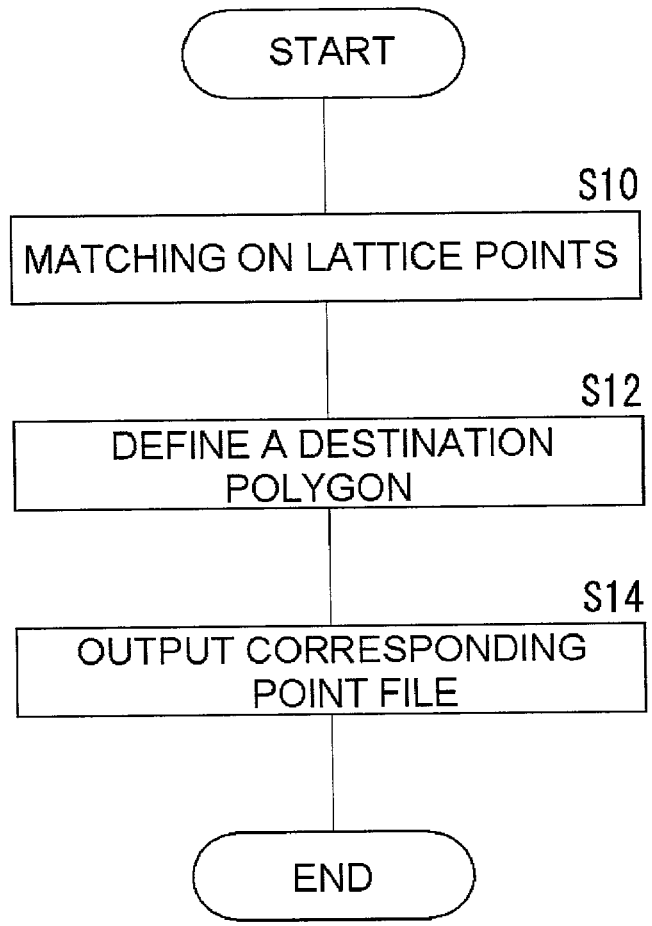
FIG. 21 is a flowchart showing a procedure for generating a corresponding point file according to the first embodiment.

FIG. 21 shows an example of the above processing procedure. Firstly, as shown in FIG. 19, the matching results on the lattice points taken on the first image I1 are acquired (S10). In particular, it is preferable that the pixel-by-pixel matching according to the base technology is performed, so that a portion corresponding to the lattice points is extracted from those results. It is to be noted that the matching results on the lattice points may be specified based on other matching techniques such as optical flow and block matching, instead of using the base technology.

Thereafter, a destination polygon is defined on the second image I2 (S12), as shown in the right side of FIG. 19. Since the above procedure completes generation of the corresponding point file, data by which to identify the first image I1 and the second image I2 are incorporated to this corresponding point file and are outputted therefrom (S14). The two images and the corresponding point file may be stored in any suitable recording device or medium, or may be transmitted directly via a network or broadcast.

Figure 22:
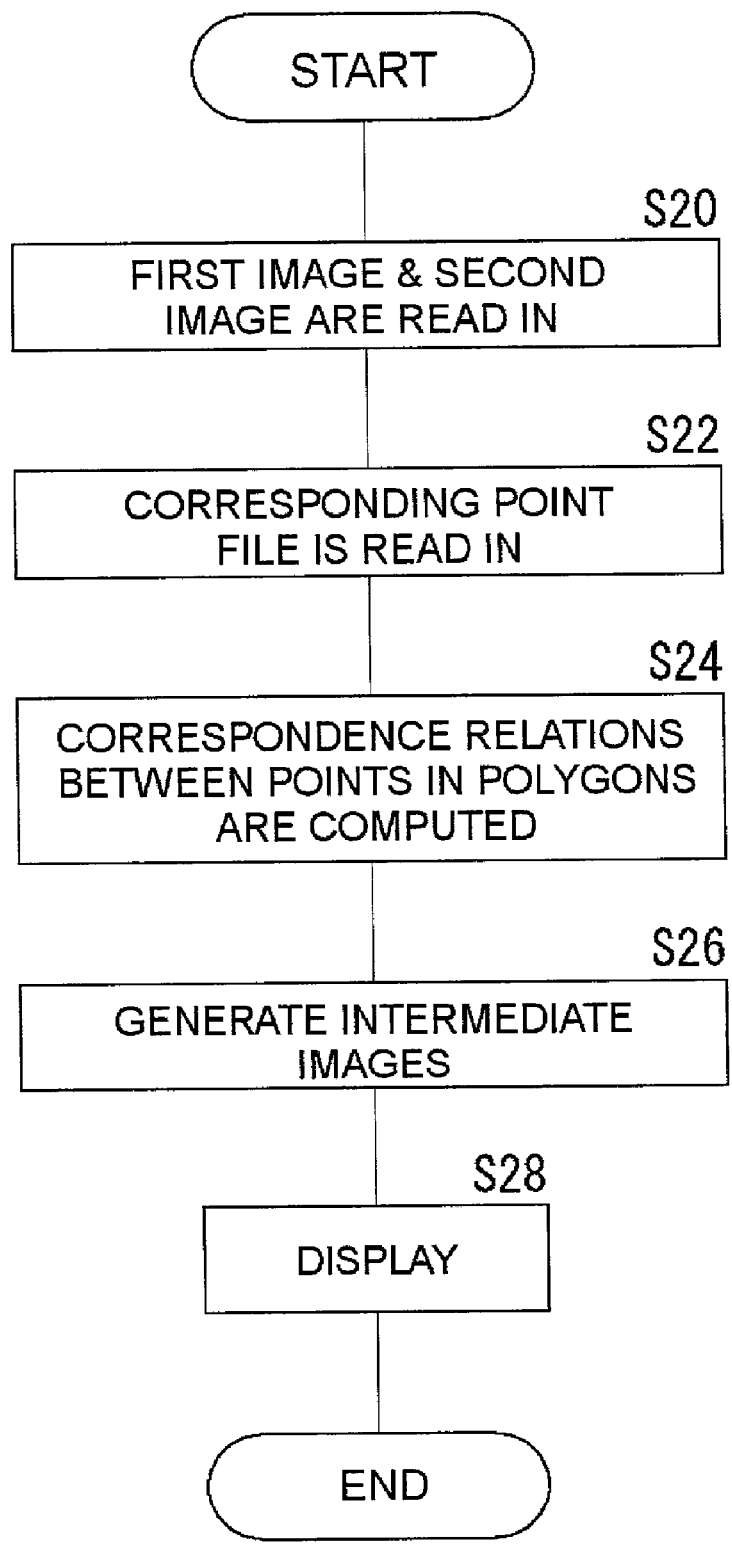
FIG. 22 is a flowchart showing a procedure for generating an intermediate image based on the corresponding point file according to the first embodiment.

FIG. 22 shows a procedure to generate intermediate images using the corresponding point file. First, the first image I1 and the second image I2 are read in (S20), then the corresponding point file is read in (S22). Thereafter, the correspondence relation between points in the source polygon and those of the destination polygon is computed by a method such as that described in reference to FIG. 20 (S24). In this way, a correspondence relation on all pixels within the image can be acquired. As described in the base technology, the coordinates and colors of points corresponding to each other may be interior-divided in the ratio u:(1−u), so that an intermediate image in a position which interior-divides temporally or spatially in the ratio u:(1−u) between the first image I1 and the second image I2 can be generated (S26). It is to be noted that not only interpolation but also extrapolation may be performed.

Figure 23:
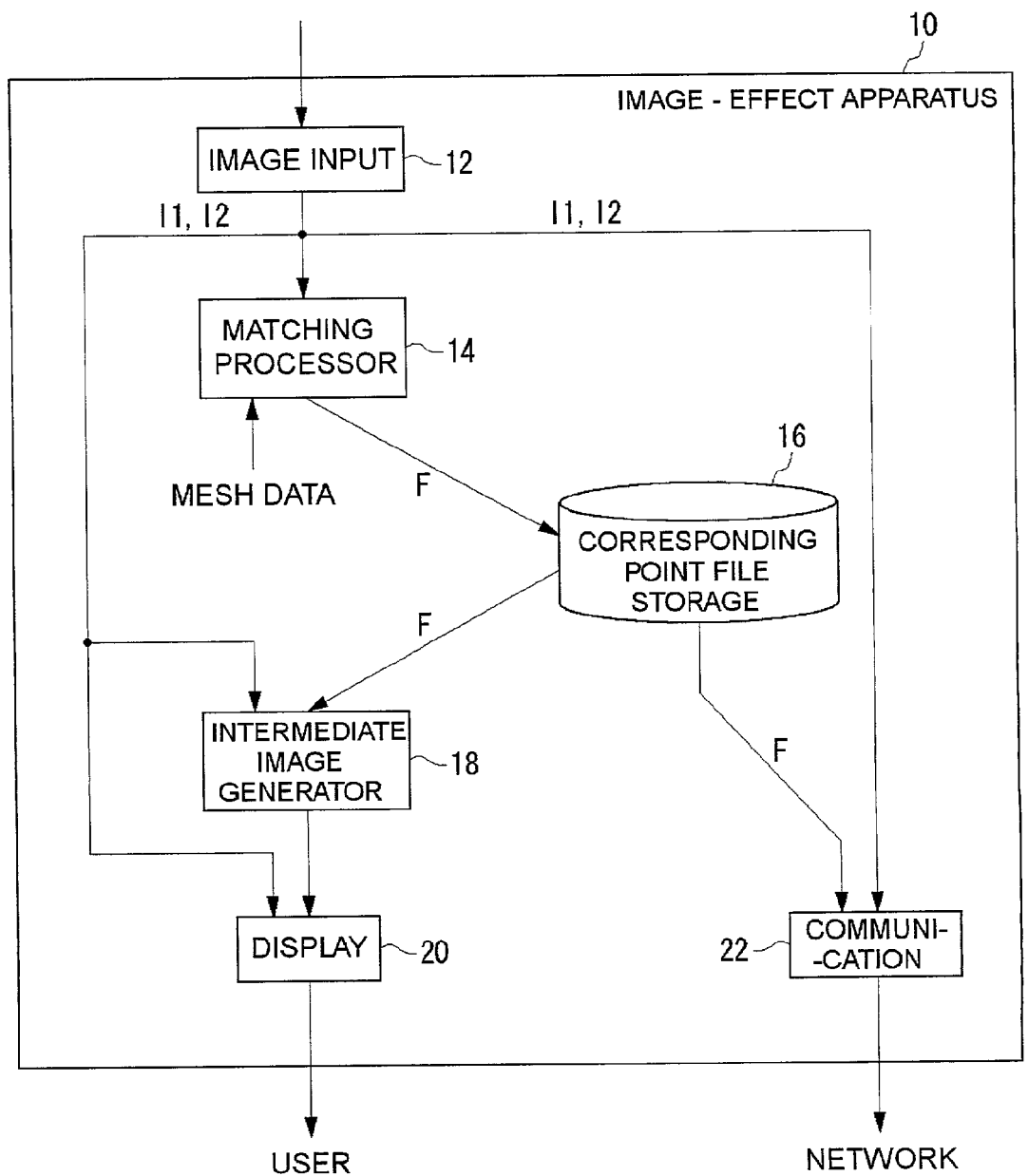
FIG. 23 shows a structure of an image interpolation apparatus according to the first embodiment.

FIG. 23 shows a structure of an image-effect apparatus 10 which may perform the above-described processing. The apparatus 10 includes: an image input unit 12 which acquires the first image I1 and the second image I2 from an external storage, a photographing camera, a network or other suitable source; a matching processor 14 which performs a matching computation on the first image I1 and the second image I2 using the base technology or other techniques, a corresponding point file storage 16 which stores the corresponding point file F generated by the matching processor 14, an intermediate image generator 18 which generates an intermediate image or images from the first image I1, the second image I2 and the corresponding point file F, and a display unit 20 which displays the first image I1, the second image I2 and the intermediate image or images as a motion picture or the like by adjusting the timing thereof. Moreover, a communication unit 22 may send the first image I1, the second image I2 and the corresponding point file F to a transmission infrastructure such as a network or the like according to an external request. It is to be noted that, in this embodiment, mesh data, which indicate the size of the mesh, the positions of the lattice points and so forth, is input in the matching processor 14 either as a default setting or by user input.

In the above-described structure, the first image I1 and the second image I2 are input in the image input unit 12 and are then sent to the matching processor 14. The matching processor performs, for example, a pixel-by-pixel matching computation in between the images. The matching processor 14 also generates the corresponding point file F based on the mesh data, and the thus generated corresponding point file F is output to the corresponding point file storage 16.

The intermediate image generator 18 reads out the corresponding point file F upon request from a user or due to other factors, and generates an intermediate image. This intermediate image is sent to the display unit 20, where a time adjustment of image output may be performed, so that motion pictures or morphing images are displayed. As evident from this operation, the intermediate image generator 18 and the display unit 20 may alternatively be provided in a remote terminal which is separated from the apparatus 10, and in that case the remote terminal can receive relatively light data (small data size) comprised of the first image I1, the second image I2 and the corresponding point file F and can independently reproduce motion pictures.

The communication unit 22 may be structured and arranged on the assumption that there is provided a remote terminal, and the communication unit 22 sends out the first image I1, the second image I2 and the corresponding point file F via a network or broadcast wave, so that motion pictures can be displayed at the remote terminal. Of course, the remote terminal may also be provided for the purpose of storage instead of display or for both functions. The apparatus may also be used in a manner that the first image I1, the second image I2 and the corresponding point file F are input from an external unit such as a network or the like via the communication unit 22, and these are transferred to the intermediate image generator 18 where the interpolation is computed so as to generate intermediate images.

An actual experiment was carried out according to the processing of the first embodiment. As an example, when a size of 256×256 was adopted for the first image and second image, satisfactory morphing or satisfactory motion picture compression effect was obtained by setting the lattice points at intervals of 10 to some tens of pixels in the vertical and horizontal directions. In this case, the size of the corresponding point file F is of some kilo to 10 kilo bytes, and it was confirmed that high image quality using a small amount of data could be achieved.

Embodiment 2

The image-effect apparatus described in the first embodiment can be utilized for commodity presentation in electronic commerce. The apparatus according to the second embodiment (hereinafter referred to as "a commodity showing apparatus") uses two adjacent images (i.e. photographs or the like) of a commodity taken from different angles as the first image I1 and the second image I2, and smoothly interpolates between these images so as to display the commodity to a user. In particular, if photographs taken from different angles of every 10 degrees around the commodity are interpolated sequentially, a smooth 360-degree revolving image can be obtained. Conventionally, such a smooth revolving image of the commodity would require the photographs to be taken from different angles of every 1 or 2 degrees, however, when the technique described in the first embodiment is utilized, the difference of the angles can be as much as 10 to 20 degrees.

Differing from the first embodiment, the commodity showing apparatus may utilize a precomposed corresponding point file F. This can be done because the images or photographs of the commodity can be prepared before the actual showing of the commodity on the Internet or the like. The commodity showing apparatus may be similar to the image-effect apparatus shown in FIG. 23 and only differences are described hereafter. The image input unit 12 acquires the corresponding point file F in addition to the first image I1 and the second image I2. These data are input directly to the intermediate image generator 18 to generate intermediate images. The intermediate images may be displayed at the display unit 20 or may be sent out to a transmission infrastructure such as a network or the like via the communication unit 22. In this embodiment the matching processor 14 and the corresponding point file storage 16 are unnecessary. It is noted that a similar structure to the commodity showing apparatus may also be effective in other embodiments.

The commodity showing apparatus provides a commodity presentation function in electronic commerce in addition to the functions described for the first embodiment. In the case where this commodity presentation function is the commodity rotation function described above, the commodity may be rotated according to instructions input via a graphical user interface (GUI) by a user. Various ways to give such instructions are known, for instance, in the field of computer graphics (CG) and such techniques may be utilized herein.

The commodity presentation function may be, as another example, to display intermediate images obtained through bilinear interpolation of the commodity images. For example, the images of the commodity may be taken at angular increments in a vertical direction as well as a horizontal direction and thereby the images can be interpolated not only horizontally but also vertically. This example of the commodity presentation function may include the following processes, for instance.

(1) Obtaining an image pair A which consists of the first image and the second image, and the corresponding point file A thereof.
(2) Obtaining an image pair B which consists of the third image and the fourth image, and the corresponding point file B thereof.
(3) Generating intermediate images by interpolation using a positional relation between an axis A, which is defined temporally or spatially between the two images of the image pair A, and an axis B, which is defined temporally or spatially between the two images of the image pair B, the corresponding point file A, and the corresponding point file B.

In the generating intermediate images (3), bilinear interpolation may be performed using the axis A and the axis B. For example, let two images taken from two viewpoints p1(0,0) and p2(0,100) be the image pair A and two images taken from other two viewpoints p3(100,0) and p4(100,100) be the image pair B. The line connecting the points p1 and p2 defines the axis A, and the line connecting the points p3 and p4 defines the axis B.

In order to obtain an image viewed from a viewpoint p' (50,50) as an intermediate image, one frame viewed from a viewpoint (0,50) is first generated based on the corresponding point information A of the image pair A. Another frame viewed from a viewpoint (100,50) is next generated based on the corresponding point information B of the image pair B. Then these two frames are interpolated, namely interior-divided in the ratio 1:1 in this case and the desired intermediate frame is generated. In order that the interpolation can be performed in both vertical and horizontal directions, it is sufficient that the image pair A and the image pair B are defined so that the axis A and the axis B do not lie in the same line.

Although the axis A and the axis B are defined spatially between the two images respectively in this example, the axes may also be defined temporally. For example, let two images taken at time t0 and t1 from one viewpoint P be the image pair A and two images taken at time t0 and t1 from another viewpoint Q be the image pair B. In this case, a line connecting between two points, each of which is respectively defined by {P,t0} and (P,t1) in the image pair A, defines the axis A. Likewise, a line connecting between two points, each of which is respectively defined by {Q,t0} and (Q,t1) in the image pair B, defines the axis B. Then, in order to obtain an image corresponding to a point ((P+Q)/2,(t0+t1)/2) as an intermediate image, as described above, two intermediate images, which have been generated concerning each of the two axes, are interpolated.

Embodiment 3

The generation of intermediate images provides opportunities for various image-effect functions. Although image effects are mentioned as a generalization above, the following provides further details on image effects. Some examples of such image-effect functions are as follows.

Two adjacent images out of a plurality of related images are chosen as the first and second images, and an intermediate image or images between these images are generated and displayed. Thereafter, other adjacent images, taken in order, are chosen as the first and second images and an intermediate image or images therebetween is generated. For example, using images S, T, U whose viewpoints are slightly different, intermediate images between the images S and T are first generated and intermediate images between the images T and U are next generated so that a sequence of images can be continuously displayed. Namely, when many discrete images with different viewpoints are sequentially interpolated and the intermediate images are generated, a panoramic image sequence or the like can be obtained.

Likewise, a temporal factor can be introduced. For example, if a plurality of discrete images are considered as images whose viewpoint has moved over time and intermediate images thereof are displayed in order, a "walk-through" image can be obtained.

Another image-effect function is to display intermediate images obtained by interpolating images to be processed in two directions. This method is realized by bilinear interpolation, for example, as described in the second embodiment. Thereby, a panoramic image or image sequence may be obtained which can smoothly change in two directions.

Still another image-effect function is to capture images (photographs) of an object while moving around the object at predetermined angles and generate a continuous image from the photographs. In the second embodiment described above, the commodity itself is turned around, however, there is also an interest in displaying images taken around an object as an image effect. In some films, special effects techniques have been used to show a body of a person suspended in the air while the point of view rotates around the person, however, using an embodiment of the present invention, such motion pictures can be generated easily using fewer photographic images.

In addition, existing image effects can be made more efficient or provide higher quality by using or being combined with the techniques according to embodiments of the invention.

The apparatus according to the present embodiment may have a GUI by which a user can specify one of the image-effect functions and implement pre-process or post-process suitable for the content that is being prepared.

For example, when a walk-through image is generated, the moving path of the viewpoint may be specified beforehand and the intermediate images may be displayed in order according to the path. When the images are interpolated in two directions, as in the second embodiment, a moving viewpoint may be input through the GUI, according to the moving direction of a mouse or the like, and thereby interpolated images may be generated. If the mouse moves from lower right to upper left, the viewpoint may be assumed to move from lower right to upper left, and bilinear interpolation may be performed.

Embodiment 4

As described above, embodiments of the present invention may also be suitable for compressing a motion picture. This is advantageous in transmitting a motion picture via the Internet and so forth since the original motion picture can be restored from a smaller number of still images. For this purpose, a utility function for generating the motion picture may be provided when the intermediate image is generated or displayed.

The utility function may, for example, provide for specifying a number of the intermediate images to be generated. If the first and second images are taken from the original motion picture at one-second intervals, there would generally be about 30 frames during each interval (conventional motion pictures are 30 frames/second). If a user specifies "30 intermediate frames", the same time scale as the original motion picture can be obtained. If "3000 intermediate frames" are specified, a slow motion picture whose time scale is extended 100 times larger can be obtained. No matter how large or small the number of intermediate frames may be, a step width in the interpolation computation can be changed accordingly. At the present time, no video camera can take 3000 frames per second, however according to the present embodiment, a super slow motion picture can be obtained at this rate.

Embodiment 5

Since embodiments of the present invention can be used to generate a motion picture using a reduced amount of data, these embodiments are advantageous when applied to a mobile device which generally has limitations on its CPU power, battery lifetime, bandwidth and memory capacity. For this reason, generation of the intermediate image may be performed based on a mobile function which assumes application to such a mobile device.

As an example of the mobile function, an intermediate image generated based on one of either the first image or the second image and the correspondence information (corresponding point file) may be displayed. In this case, an amount of memory capacity required to temporarily store the images can be saved. As an example, when the intermediate image is generated from only the correspondence information and the first image, the first image may be displayed and then points in the first image, such as pixels, and polygons of the meshes on the first image and so forth may be moved according to the correspondence information. That is, although normally the position and value of the pixels would be interpolated using the correspondence information, the process is simplified and reduced to only the movement of the position of the pixels of the first image.

As another example of the mobile function, an intermediate image may be generated through a streaming process involving only the first image and the correspondence relation. For instance, the following processes are repeated and thereby the stream of a motion picture can be displayed using a relatively small memory capacity.

1. The intermediate images at time t=0 to t=1 are generated from the image I(0) at time t=0 and the correspondence relation, and displayed, while the image I(0) is discarded.

2. The intermediate images at time t=1 to t=2 are generated from the image I(1) at time t=1 and the correspondence relation, and displayed, while the image I(1) is discarded.

In any of the embodiments according to the invention, it is sufficient that the intermediate images exist in a frame buffer at the moment of display and do not necessarily need to be otherwise stored.

Although the present invention has been described by way of exemplary embodiments, it should be understood that many changes and substitutions may be made by those skilled in the art without departing from the scope of the present invention which is defined by the appended claims.

What is claimed is:

1. An image interpolation method, comprising:
    for three or more images, obtaining correspondence information between a source polygon which constitutes a mesh provided on a first image and a destination polygon which constitutes a mesh on a second image such that an intermediate image can be generated between the first image and the second image based on the correspondence information; and
    providing an electronic commerce commodity presentation function that generates one or more intermediate images by interpolating the three or more images in at least two dimensions based on the three or more images and the correspondence information.

2. The method of claim 1, wherein said commodity presentation function comprises displaying a commodity rotating according to an instruction from a user.

3. An image interpolation method, comprising: for three or more images, obtaining correspondence information between a source polygon which constitutes a mesh provided on a first image and a destination polygon which constitutes a mesh on a second image such that an intermediate image can be generated between the first image and the second image based on the correspondence information; and
    providing an image-effect function that generates one or more intermediate images by interpolating the three or more images in at least two dimensions based on the three or more images and the correspondence information.

4. The method of claim 3, wherein the image-effect function comprises:
    choosing sets of two images out of the three or more images a the first image and the second image on each of two distinct axes;
    generating intermediate images on each of the axes; and
    interpolating between said generated intermediate images on each of the axes to generate resulting intermediate images; and
    smoothly displaying the resulting intermediate images generated.

5. An image interpolation method, comprising: obtaining correspondence information between a source polygon which constitutes a mesh provided on a first image and a destination polygon which constitutes a mesh on a second image;
    generating intermediate images between the first image and the second image based on the correspondence information; and
    providing a utility function for specifying a number of intermediate images to be generated in generating a motion picture when the intermediate images are generated.

6. The method of claim 5, wherein the specification of the number of intermediate images to be generated is obtained from a user.

7. An image interpolation method, comprising: obtaining correspondence information between a source polygon which constitutes a mesh provided on a first image and a destination polygon which constitutes a mesh on a second image;
    generating an intermediate image between the first image and the second image based on the correspondence information; and performing the generation of the intermediate image based on a mobile function which assumes application to a mobile device under which the intermediate image is generated based on said correspondence information and one of the first image and the second image.

8. The method of claim 7, wherein the intermediate image is generated through performing a streaming process for either the first image or the second image and said correspondence information.

9. An image interpolation apparatus, comprising an intermediate image generating unit which, for three or more images, obtains correspondence information between a source polygon which constitutes a mesh provided on a first image and a destination polygon which constitutes a mesh on a second image such that an intermediate image can be generated between the first image and the second image based on the correspondence information, wherein said intermediate image generating unit provides an electronic commerce commodity presentation function that generates one or more intermediate images by interpolating the three or more images in at least two dimensions based on the three or more images and the correspondence information.

10. The apparatus of claim 9, wherein said commodity presentation function comprises displaying a commodity rotating according to an instruction from a user.

11. The apparatus of claim 9, further comprising a display unit which adjusts a timing of the intermediate image, the first image, and the second image and displays these images.

12. An image interpolation apparatus, comprising an intermediate image generating unit which, for three or more images, obtains correspondence information between a source polygon which constitutes a mesh provided on a first image and a destination polygon which constitutes a mesh on a second image such that an intermediate image can be generated between the first image and the second image based on the correspondence information, wherein said intermediate image generating unit provides an image-effect function that generates one or more intermediate images by interpolating the three or more images in at least two dimensions based on the three or more images and the correspondence information.

13. The apparatus of claim 12, wherein the image-effect function comprises sequentially choosing two images out of a plurality of images as the first image and the second image, and smoothly displaying the intermediate image generated from the sequentially chosen two images.

14. The apparatus of claim 12, further comprising a display unit which adjusts a timing of the intermediate image, the first image, and the second image and displays these images.

15. An image interpolation apparatus, comprising an intermediate image generating unit which obtains correspondence information between a source polygon which constitutes a mesh provided on a first image and a destination polygon which constitutes a mesh on a second image, and generates one or more intermediate images between the first image and the second image based on the correspondence information, wherein said intermediate image generating unit provides a utility function for generating a motion picture based on said the intermediate images, and wherein said utility function includes a function for specifying a number of intermediate images to be generated.

16. The apparatus of claim 15, wherein the specification of the number of intermediate images to be generated is obtained from a user.

17. The apparatus of claim 15, further comprising a display unit which adjusts a timing of the intermediate image, the first image, and the second image and displays these images.

18. An image interpolation apparatus, comprising an intermediate image generating unit which obtains correspondence information between a source polygon which constitutes a mesh provided on a first image and a destination polygon which constitutes a mesh on a second image, and generates an intermediate image between the first image and the second image based on the correspondence information, wherein said intermediate image generating unit displays the intermediate image based on a mobile function which assumes application to a mobile device under which the displaying the intermediate image is based on said correspondence information and one of the first image and the second image.

19. The apparatus of claim 18, wherein the intermediate image is generated through performing a streaming process for either the first image or the second image and said correspondence information.

20. The apparatus of claim 18, further comprising a display unit which adjusts a timing of the intermediate image, the first image, and the second image and displays these images.

* * * * *